United States Patent
Schenk et al.

(10) Patent No.: US 7,274,762 B2
(45) Date of Patent: Sep. 25, 2007

(54) CALCULATION CIRCUIT FOR CALCULATING A SAMPLING PHASE ERROR

(75) Inventors: Heinrich Schenk, Munich (DE); Dirk Daecke, Munich (DE)

(73) Assignee: Infineon Technologies AG, Munich (DE)

( * ) Notice: Subject to any disclaimer, the term of this patent is extended or adjusted under 35 U.S.C. 154(b) by 1095 days.

(21) Appl. No.: 10/390,831

(22) Filed: Mar. 18, 2003

(65) Prior Publication Data

US 2003/0212947 A1 Nov. 13, 2003

(30) Foreign Application Priority Data

Mar. 23, 2002 (DE) ............................... 102 12 913

(51) Int. Cl.
*H04L 7/00* (2006.01)
*H04L 27/00* (2006.01)
*H04L 27/06* (2006.01)
*H04K 7/40* (2006.01)
*H03M 13/03* (2006.01)

(52) U.S. Cl. ...................... 375/355; 375/232; 375/233; 375/354; 375/316; 375/340; 714/786

(58) Field of Classification Search ........ 375/229–236, 375/340, 354, 355, 316, 321; 331/18; 348/614; 708/322; 714/786
See application file for complete search history.

(56) References Cited

U.S. PATENT DOCUMENTS

| | | | |
|---|---|---|---|
| 5,581,585 A * | 12/1996 | Takatori et al. ............. | 375/376 |
| 6,707,868 B1 * | 3/2004 | Camagna et al. ............ | 375/371 |
| 6,754,293 B1 * | 6/2004 | Henriksson et al. ........ | 375/346 |
| 6,865,588 B2 * | 3/2005 | Ling et al. .................. | 708/322 |
| 6,985,549 B1 * | 1/2006 | Biracree et al. ............ | 375/355 |
| 7,039,104 B2 * | 5/2006 | Shanbhag et al. .......... | 375/234 |
| 2003/0152180 A1 | 8/2003 | Schenk | |

FOREIGN PATENT DOCUMENTS

DE 100 25 566 A1 12/2001
DE 10025566 12/2001

OTHER PUBLICATIONS

Mueller et al., "Timing Recovery in Digital Synchronous Data Receivers," *IEEE, Inc.*, New York, pp. 516-531, May 1, 1976.
European Search Report dated Oct. 28, 2005.

* cited by examiner

*Primary Examiner*—Mohammed Ghayour
*Assistant Examiner*—Sophia Vlahos
(74) *Attorney, Agent, or Firm*—Jenkins, Wilson, Taylor & Hunt, P.A.

(57) ABSTRACT

A calculation circuit for calculating a sampling phase error is provided. According to one aspect, a calculation circuit includes a first delay element chain having serially connected delay elements, for delaying a digital estimate of a decision device; a second delay element chain having serially connected delay elements, for delaying an equalized signal; a multiplier array which multiplies the undelayed digital estimate and the delayed estimates of all the delay elements of the first delay element chain by the equalized signal and the delayed output signals of all the delay elements of the second delay element chain to generate product signals; a weighting circuit multiplies the product signals generated by the multiplier array by adjustable weighting factors; and having an adder which adds the product signals weighted by the weighting circuit to the sampling phase error signal.

32 Claims, 25 Drawing Sheets

Distortionless received pulse with rolloff factor = 0.2 without excess bandwidth Mean value of the clock regulation criterion according to /1/

Mean value of the clock regulation criterion with Trk(i) = -1, -1, -1, 0, 1, 1, 1(N=3)

Distorted received pulse with rolloff factor = 0.2 and an excess bandwidth of 50%

Mean value of the clock regulation criterion according to /1/

Mean value of the clock regulation criterion with Trk(i)=0, -1,-0.7, 0, 0.7, 1, 0 (N=3)

Equalized received pulse with rolloff factor = 0.2 and an excess bandwidth of 50%

Mean value of the clock regulation criterion according to /1/

Mean value of the clock regulation criterion with Trk(i)=0, -1, -0.75, 0, 0.75, 1, 0 (N=3)

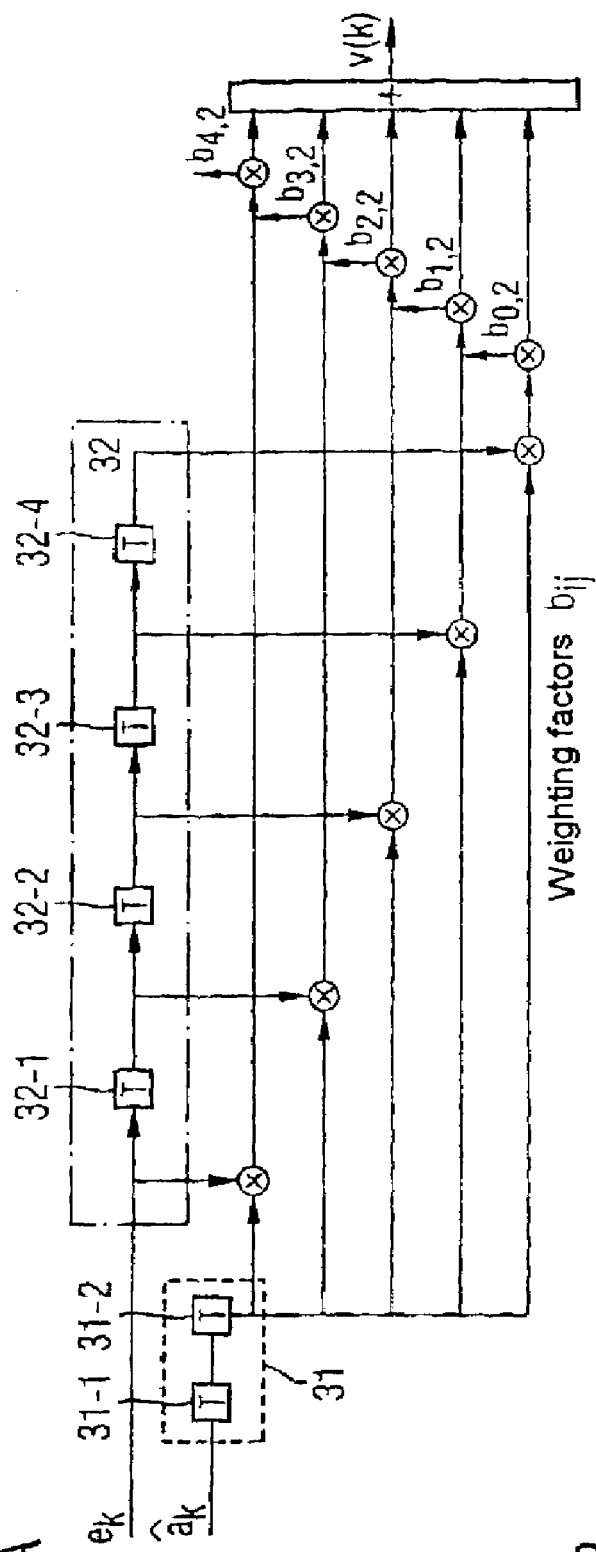
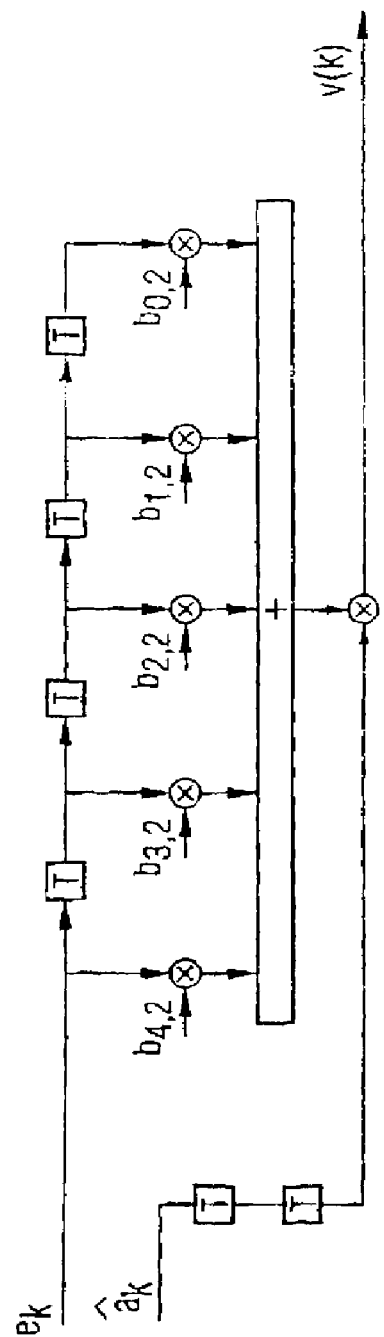
FIG 14A
FIG 14B

CALCULATION CIRCUIT FOR CALCULATING A SAMPLING PHASE ERROR

TECHNICAL FIELD

The invention relates to a calculation circuit for calculating a sampling phase error for a decision feedback clock phase regulation circuit.

BACKGROUND ART

FIG. 1 shows a data transmission system according to the prior art. A transceiver, or a transmitting and receiving circuit, receives transmitted data from a data source and sends these as an analog transmitted signal to another transceiver via a data transmission line. The data transmission line is, for example, a two-wire telephone line made from copper. In this case, the transceiver at the exchange end COT (central office terminal) constitutes the clock master, that is to say the transmitted signal is emitted at the exchange end synchronously with a clock signal of the transceiver. The transceiver at the subscriber end RT forms the so-called clock slave, that is to say the clock signal recovered at the receiving end is used as the transmitting clock thereof.

In the event of defective synchronization of the transceiver RT at the subscriber end, the clock frequency of the transmitted signal corresponds exactly to the clock frequency of the received signal. Consequently, the clock regulation circuit of the transceiver at the exchange end need only set the exact sampling phase in the receiver included therein. The sampling phase is a function in this case chiefly of the signal propagation time of the transmission line.

In the data transmission system illustrated in FIG. 1, the data are transmitted simultaneously in both directions via the transmission line. This is therefore a so-called full duplex data transmission system. The analog received signal of a transceiver is composed in this case of two signal components, specifically the transmitted signal emitted by the opposite transceiver, and the signal component coupled in by its own transmitting device, or the echo signal component. The echo signal component in this case constitutes interference, and is compensated in the receiver of the transceiver by means of an echo compensation circuit. The echo compensation circuit within the transceiver in this case calculates as accurately as possible an estimate for the echo signal component and subtracts the latter from the received signal.

In digital data transmission, the transmitter sends at a symbol rate 1/T which is not known at the receiving end. As a rule, the frequency and phase of the transmitting and receive clock deviate from one another. When the transmitting and receive clocks deviate from one another, the sampled received signal differs from the transmitted signal. In order to recover the original transmitted signal, it is necessary for the receiver clock signal to run at the same frequency as the clock signal of the transmitter. It is necessary, moreover, for the receiver clock signal to have the same phase as the transmitted signal.

FIG. 2 shows a conventional transceiver according to the prior art. The transceiver consists of a transmitted signal path and a received signal path. The transmitted data and/or transmitted data symbols are firstly fed in the transmitted signal path to a transmitting filter, and subsequently converted into an analog transmitted signal by means of a digital-to-analog converter. The analog transmitted signal is supplied to a hybrid circuit in a fashion amplified with the aid of a driver circuit. The hybrid circuit is connected to the data transmission line.

At the received signal path, the received analog signal is firstly filtered by an analog received filter EF, and subsequently sampled. The sampling is performed within a sampling circuit which either consists of an analog-to-digital converter or, as illustrated in FIG. 2, an analog-to-digital converter, an interpolation filter IF and a downstream interpolator. The analog-to-digital converter in this case samples the analog received signal with the aid of a freerunning operating rate signal. The sampled signal is subsequently fed to the digital interpolation filter IF and interpolated by the interpolator. The interpolator is fed a regulated sampling rate signal for this purpose.

Connected downstream of the sampling circuit is a subtractor circuit which subtracts the estimate signal calculated by the echo compensation circuit from the sampled digital received signal by generating an echo-compensated digital received signal. The echo compensation circuit uses the received transmitted data symbols to calculate the echo signal to be expected, and subtracts the latter from the received signal. The echo compensation circuit is adaptively adjustable as a rule. The echo compensation circuit is set adaptively as a function of the transfer function of the transmission line and the analog components, such as the transformer, for example.

The differential signal formed by the subtractor is fed to an amplitude regulation circuit AGC (Automatic Gain Control). The amplitude-regulated digital received signal is subsequently equalized by an equalizer. The downstream decision device uses the equalized received signal to determine an estimate for the transmitted data symbol originally emitted by the other transceiver. The transmitted data symbol obtained is supplied to the data sink for further data processing by the transceiver. A subtractor subtracts the signal values upstream and downstream of the decision device. This error signal or deviation signal serves as adjusting signal for the echo compensation circuit.

A control circuit is used to generate a clock regulation criterion or a clock regulation control signal for the regulation of the sampling phase of the received signal. The clock regulation control signal specifies a phase deviation between the signal phase of the sampling rate signal and a desired setpoint signal phase of an ideal sampling rate signal. The clock regulation criterion or the clock regulation control signal is a measure of the phase error between the ideal sampling rate, for which a maximum signal-to-noise ratio exists, and the actual sampling rate. The clock regulation control signal is generated by the control circuit from the samples upstream and downstream of the decision device (decision feedback regulation) and, furthermore, from at least one of the coefficients of the linear equalizer EQ. The clock regulation criterion or the clock regulation control signal is composed in this case of two components, specifically of a signal component which is a function of the samples upstream and downstream of the decision device, and of a second signal component, which is a function both of one or more coefficients of the linear equalizer and of a phase reference signal value which is suitably prescribed and applied to the control circuit. Given an optimally adjusted sampling phase, the signal component which is a function of the coefficient corresponds to the prescribed phase reference signal value. The control circuit therefore continuously generates a control variable which is a measure of the deviation of the sampling phase from the setpoint phase.

The generated clock regulation control signal is supplied to a digital loop filter. The output signal of the loop filter directly regulates the sampling phase of the sampling rate signal for the sampling circuit. This is implemented as a rule with the aid of a phase counter.

The time-continuous received signal is sampled in the digital receiver of the transceiver with the aid of a receiver symbol clock. Since the symbol clock of the original transmitted signal is unknown at the receiving end, the symbol clock of the received signal is generated by means of the clock phase regulation circuit. The clock signal is derived from the received signal for this purpose. This is also denoted as self synchronization. In addition to the symbol clock frequency, the correct sampling phase is also adjusted by means of the clock regulation loop.

FIG. 3 shows an adaptive equalizer according to the prior art. The output signal of the amplitude regulation circuit AGC is fed to a chain of delay elements whose output signal are [sic] multiplied in each case by a filter coefficient $C_i$ of the equalizer. The output signals weighted with the filter coefficients are fed to an adder and summed up there. The output signal of the adaptive equalizer y(k) is fed to the decision device within the transceiver in accordance with FIG. 2.

FIG. 4 shows a control circuit within a transceiver according to the prior art. The control circuit serves to generate a clock regulation control signal which specifies the phase deviation between the signal phase of the sampling signal and a setpoint signal phase of an ideal sampling signal. This clock regulation control signal is filtered by the downstream loop filter and fed to the phase counter in order to generate the sampling rate signal. The control circuit includes a calculation circuit for calculating a clock regulation criterion u(k) as a function-of the equalized digital received signal y(k) and the digital estimate signal a(k) at the output of the decision device. As digital output signal of the calculation circuit, the clock regulation criterion u(k) formed is multiplied by a first scaling factor $SK_1$ and fed to an adder. The filter coefficients $C_i$ of the adaptive equalizer are tapped and multiplied by stored decoupling coefficients $g_i$. An adder adds the output signals of the multiplier to a stored phase signal reference value. The output signal of the adder is zero in the steady state. The output signal of the adder is multiplied by a second scaling factor $SK_2$ and subsequently summed up by the summation circuit with the scaled clock regulation criterion to form the clock regulation control signal. The decoupling coefficients $g_i$, which are preferably stored in a memory, are adjusted as a function of the data transmission channel, and are multiplied by the filter coefficients $c_i$ of the adaptive equalizer in order to decouple the adaptive equalization from the clock regulation.

FIG. 5a shows a calculation circuit for the clock regulation criterion within the control circuit according to the prior art.

FIG. 5b shows a further known calculation circuit for a clock regulation criterion within the control circuit according to the prior art.

The calculation circuits according to the prior art which are illustrated in FIGS. 5a, 5b are so-called Mueller and Müller synchronizers such as are described, for example, in "Timing recovery in digital synchronous data receivers" IEEE Trans. Commun. volume COM 24, pages 516-531, May 1976. The Müller-Müller sampling phase error detectors as illustrated in FIGS. 5a, 5b exhibit a relatively large phase jitter for transmission links H whose pulse responses extend over a relatively large number of clock cycles T. Phase jitter leads to a worsening of the bit error rate.

The clock phase regulation circuit according to the prior art which is illustrated in FIGS. 2 to 5 has the disadvantage that in the case of a data transmission system with excess bandwidth such as, for example, HDSL-2, HDSL-4 or else SDSL it does not permit stable clock regulation, since the mean value of the clock regulation criterion does not exhibit a monotonically rising zero crossing around the sampling instant.

The excess bandwidth is greater than the minimum bandwidth. The minimum bandwidth for data transmission is half the symbol rate, that is to say the minimum bandwidth=½× symbol clock rate=½×1/T.

FIG. 6a shows a distortionless received pulse of a transceiver in the case of a data transmission system without excess bandwidth and with a rolloff factor of 0.2.

FIG. 6b shows the mean value of the clock regulation criterion u(k) according to the prior art formed by the calculation circuit within the control circuit. The conventional calculation circuits illustrated in FIGS. 6a [sic], 5b for calculating the clock regulation criterion u [lacuna] led to a propagation time delay of T. The received pulse illustrated in FIG. 6a is completely distortionless, that is to say no symbol interference occurs. The zero crossings of the received pulse are situated exactly at multiples of the symbol clock pulse T. The maximum of the distortionless received pulse illustrated is at the symbol clock pulse 4×T in FIG. 6a. The sampling instant, which is one symbol clock pulse later (1×T) in the case of the calculation circuits illustrated in FIGS. 5a, 5b, is in a monotonically rising region of the calculated mean value u. The characteristic line has a monotonically rising profile about the sampling instant 5×T, and so a stable clock phase regulation is ensured when there is no excess bandwidth. The characteristic line runs in an approximately linear fashion about the sampling instant 5×T.

In a conventional transceiver as illustrated in FIG. 2, the excess bandwidth is determined by the transmitting filter SF and the receive filter EF. FIG. 7a shows a distorted received pulse of a transceiver with a rolloff factor=0.2 and an excess bandwidth of 50%. In the case of the received pulse, distortions of the received signal occur owing to the excess bandwidth. The zero crossings of the received pulse no longer lie in the clock pulse symbol array or at the multiple of the symbol clock pulse T. FIG. 7b shows the profile of the mean value of the clock regulation criterion calculated by the conventional calculation circuit. In the region of the sampling instant (5×T), the mean value formed exhibits not a monotonically rising or falling profile, but an S-shaped profile with a point of inflection. No monotonically rising or falling zero crossing is present in the region of the sampling instant. In the case of the conventional clock phase regulation circuit according to the prior art the regulating characteristic is not approximately linear, and therefore also not stable, in the region of the sampling instant for a data transmission system with excess bandwidth.

Again, in the case of the conventional clock phase regulation circuit the equalizer provided in the transceiver cannot prevent the occurrence of unstable regulation, as may be seen from FIG. 8. FIG. 8 shows the case of a received pulse, originally received in a distorted fashion, which is equalized by the equalizer provided in the transceiver, the data transmission system having an excess bandwidth of 50%. As may be seen from FIG. 8b, in the region of the sampling instant the profile of the mean value for the clock regulation criterion calculated by the conventional calculation circuit is likewise S-shaped. Even given equalization by an equalizer, there is no monotonically running zero crossing in the region of the sampling instant, and so stable clock phase regulation is not possible.

SUMMARY OF THE INVENTION

It is therefore the object of the present invention to create a calculation circuit for calculating a sampling phase error signal for a decision feedback clock phase regulation circuit which has a stable control response even in the case of a data transmission system with excess bandwidth.

In the case of long pulse responses, a conventional sampling phase error detector generates a self-interference signal (systematic phase jitter). However, jitter leads to a worsening in the bit error rate of the received signal.

The circuit according to the invention permits synchronization with much lower phase jitter than conventional circuits, even in the case of long pulse responses. In addition, conventional circuits do not have a stable control response in the case of many pulse shapes (for example excess bandwidth pulses, asymmetric pulses).

A further advantage of the inventive calculation circuit consists in that the circuit can be used universally in the most varied applications, and can be adapted to arbitrary data transmission links H, because of the multiplicity of the adjustable weighting factors.

This object is achieved according to the invention by means of a calculation circuit for calculating a sampling phase error signal for a clock phase regulation circuit having the features specified in patent claim 1 or patent claim 17.

The invention creates a calculation circuit for calculating a sampling phase error signal for a decision feedback clock phase regulation circuit, having:

(a) a first delay element chain, which has a plurality of serially connected delay elements, for delaying a digital estimate $â_k$ of a decision device;

(b) a second delay element chain, which has a plurality of serially connected delay elements, for delaying an equalized signal ($z_k$, $e_k$);

(c) a multiplier array which consists of multipliers arranged in matrix form and which multiplies the undelayed digital estimate $â_k$ and the delayed estimates of all the delay elements of the first delay element chain by the equalized signal ($z_k$, $e_k$) and the delayed output signals of all the delay elements of the second delay element chain in order to generate product signals;

(d) a weighting circuit which multiplies the product signals generated by the multiplier array by adjustable weighting factors ($b_{ij}$); and having (e) an adder which adds the product signals weighted by the weighting circuit to the sampling phase error signal ($V_k$) which is output via a signal output of the calculation circuit.

A preferred embodiment of the clock phase regulation circuit is characterized in that a subtraction circuit is present which generates a differential signal ($e_k$) between the digital received signal ($z_k$), equalized by an equalizer, and the estimate $â_k$ formed by the decision device.

A possible embodiment of the clock phase regulation circuit is characterized in that the differential signal ($e_k$) is applied to the second delay element chain.

A preferred embodiment of the clock regulation circuit is characterized in that the number (L) of the serially connected delay elements in both delay element chains is identical.

A preferred embodiment of the clock phase regulation circuit is characterized in that the delay elements are clocked at the symbol clock rate of the digital received signal.

A preferred embodiment of the clock phase regulation circuit is characterized in that the signal output of the calculation circuit is connected to a loop filter for filtering the sampling phase error signal.

A preferred embodiment of the clock phase regulation circuit is characterized in that a phase counter is connected downstream of the loop filter.

A preferred embodiment of the clock phase regulation circuit is characterized in that the decision device receives a digital received signal transmitted via a transmission link (H).

The longer the pulse response h (t) lasts, the more delay elements there are connected serially in the delay element chains.

The number (L) [sic] of the serially connected delay elements is preferably smaller than the number of the clock pulses (T) of the pulse response h (t).

A preferred embodiment of the clock phase regulation circuit is characterized in that the transmission link (H) has:

a digital transmitting filter of a transmitter, a digital-to-analog converter for converting the digital transmitted signal into an analog transmitted signal, a transmission channel for transmitting the transmitted signal to a receiver, an analog-to-digital converter for converting the received signal received via the transmission channel into a digital received signal, a digital receive filter for filtering the digital received signal, an equalizer for equalizing the received signal.

A preferred embodiment of the clock phase regulation circuit is characterized in that an interpolator is provided between the receive filter and the equalizer.

A preferred embodiment of the clock phase regulation circuit is characterized in that the analog-to-digital converter operates with a freerunning operating cycle, the interpolator being controlled by the sampling rate signal output by the phase counter.

A preferred embodiment of the clock phase regulation circuit is characterized in that the multiplier array includes $L^2$ multipliers for generating $L^2$ product signals.

A preferred embodiment of the clock phase regulation circuit is characterized in that the weighting circuit has $L^2$ multipliers for multiplying the product signals by the adjustable weighting factors.

A preferred embodiment of the clock phase regulation circuit is characterized in that a programmable memory unit (40) is provided for storing the weighting factors.

A preferred embodiment of the clock phase regulation circuit is characterized in that the sampling phase error signal is calculated by the sampling phase detector in accordance with the following equation where:

$$V(\tau) = [a_0, a_1, \ldots] * H_{\langle L-1, L-1 \rangle} * B_{\langle L-1, L-1 \rangle} * \begin{bmatrix} \hat{a}_0 \\ \hat{a}_1 \\ \vdots \\ \hat{a}_{L-1} \end{bmatrix}$$

where:
$a_i$ are the transmitted symbols;
H is the transmission matrix of the transmission link;
B is the weighting coefficient matrix of the weighting circuit, and
$\hat{a}_i$ are the symbol estimates of the decision device.

A further preferred embodiment of the clock phase regulation circuit comprises a calculation circuit for calculating a sample phase error signal for a decision feedback clock phase regulation circuit, having:

(a) a subtraction circuit which generates a differential signal between a digital received signal ($z_k$), equalized by an equalizer, and a digital estimate $\hat{a}_{(K)}$ formed by a decision device;

(b) a nonrecursive digital filter for filtering the differential signal ($e_k$),
the nonrecursive digital filter having a delay element chain with a number of serially connected delay elements whose delayed output signals are multiplied in each case by an adjustable weighting coefficient and are added by an adder to a digital filter output signal,
the weighting coefficient for the output signal of the delay element situated in the middle of the delay element chain being zero;

(c) a delay circuit for delaying the digital estimate signal $\hat{a}_{(K)}$ with a delay time (N*T) between an input of the nonrecursive digital filter and the delay element, situated in the middle, inside the delay element chain, and having (d) a multiplier which multiplies the digital filter output signal of the nonrecursive digital filter by the output signal of the delay circuit to form the sampling phase error signal $V_k$.

A preferred embodiment of the clock phase regulation circuit is characterized in that the weighting coefficients for the remaining delay elements of the delay element chain have values with point symmetry relative to the weighting coefficients for the delay element situated in the middle when the pulses of the received signal are symmetrical.

A preferred embodiment of the clock phase regulation circuit is characterized in that connected downstream of the subtraction circuit is a sign circuit which detects the sign of the differential signal and supplies it to the nonrecursive digital filter.

A preferred embodiment of the clock phase regulation circuit is characterized in that connected upstream of the delay circuit is a second sign circuit, which detects the sign of the digital estimate signal and supplies it to the delay circuit.

A preferred embodiment of the clock phase regulation circuit is characterized in that the equalizer is an adaptive equalizer.

A preferred embodiment of the clock phase regulation circuit is characterized in that the filter coefficients ($C_i$) of the adaptive equalizer are multiplied by stored decoupling coefficients ($g_i$) and added to a phase reference signal value by means of an adder to form a decoupling signal.

A preferred embodiment of the clock phase regulation circuit comprises:

(a) an analog-to-digital converter which samples an analog received signal with the aid of a sampling rate signal in order to generate a digital received signal;

(b) an equalizer for equalizing the digital received signal;

(c) a decision device which is connected downstream of the equalizer and generates a digital estimate signal $\hat{a}_K$ for the received signal from the equalized digital received signal;

(d) a sampling phase error detector for generating a sample phase error signal $v_k$ for clock phase regulation, which specifies the phase deviation between the signal phase of the sampling rate signal and a setpoint signal phase of an ideal sampling rate signal; and having (e) a loop filter which filters the sampling rate error signal $v_k$ and supplies it as a sample signal to the analog-to-digital converter;

(f) the sampling phase error detector having:
a subtraction circuit (2) [sic] which generates a differential signal $e_k$ between the equalized digital received signal $z_k$ and the digital estimate signal $\hat{a}_K$,
a first delay element chain which has a plurality of serially connected delay elements, for delaying the digital estimate $\hat{a}_K$ of the decision device,
a second delay element chain, which has a plurality of serially connected delay elements, for delaying the equalized differential signal $e_k$,
a multiplier array which consists of multipliers arranged in matrix form and which multiplies the undelayed digital estimate $\hat{a}_K$ and the delayed estimates of all the delay elements of the first delay element chain by the equalized differential signal $e_k$ and the delayed differential signals of all the delay elements of the second delay element chain in order to generate product signals,
a weighting circuit which multiplies the product signals generated by the multiplier array by adjustable weighting factors,
and an adder which adds the product signals weighted by the weighting circuit in order to generate the sampling phase error signal $v_k$, which is supplied to the loop filter via a signal output of the sampling phase error detector.

A preferred embodiment of the clock phase regulation circuit is characterized in that it is provided in a transceiver.

A preferred embodiment of the clock phase regulation circuit is characterized in that an echo signal compensation circuit is provided for compensating an echo signal which is caused by a transmitted signal sent by the transceiver.

A preferred embodiment of the clock phase regulation circuit is characterized in that an amplitude limiting circuit is provided which limits the amplitude of the filtered control signal to a limiting value, the limiting value being a function of an adjusting signal for the echo signal compensation circuit.

A preferred embodiment of the clock phase regulation circuit is characterized in that a digital output signal of the echo compensation circuit is subtracted from filtered digital received signals by means of a subtractor in order to generate an echo-compensated digital received signal.

A preferred embodiment of the clock phase regulation circuit is characterized in that it is provided in a data receiving device.

A preferred embodiment of the clock phase regulation circuit is characterized in that the data receiving device is a receiver for receiving an analog received signal.

A preferred embodiment of the clock phase regulation circuit is characterized in that the data receiving device is a reading device for reading out an analog signal.

The inventive calculation circuit has the advantage that it has a stable control response for all data transmission systems with excess bandwidth such as, for example, HDSL-2, HDSL-4, SDSL with asymmetric PSD.

Even in the case of data transmission systems with excess bandwidth, the inventive calculation circuit permits the use of T equalizers, that is to say equalizers which operate with the symbol clock pulse T. In the case of conventional clock phase regulation circuits, it has been necessary to date for this purpose to use T½ equalizers which carry out equalization at double the symbol clock rate.

Transceivers which use T equalizers are less complicated in terms of circuitry by comparison with transceivers which use T½ equalizers. This has the advantage, in turn, that the power loss of a transceiver with the inventive clock phase regulation circuit is lower by comparison with transceivers with conventional clock phase regulation circuits, and also that the required chip area of a transceiver with the inventive clock phase regulation circuit is smaller by comparison with the previous transceivers.

The inventive decision feedback clock phase regulation circuit has a favorable jitter response, in particular a low phase jitter.

The inventive clock phase regulation circuit can also be used when use is made of an adaptive equalizer.

Preferred embodiments of the inventive calculation circuit for calculating a clock regulation criterion for a clock phase regulation circuit of a transceiver are described below with reference to the attached figures in order to explain features essential to the invention.

BRIEF DESCRIPTION OF THE DRAWINGS

In the drawing:

FIGS. 14a, 14b show a preferred refinement of the sampling phase detector illustrated in FIG. 12;

DETAILED DESCRIPTION OF THE INVENTION

Figure 9:
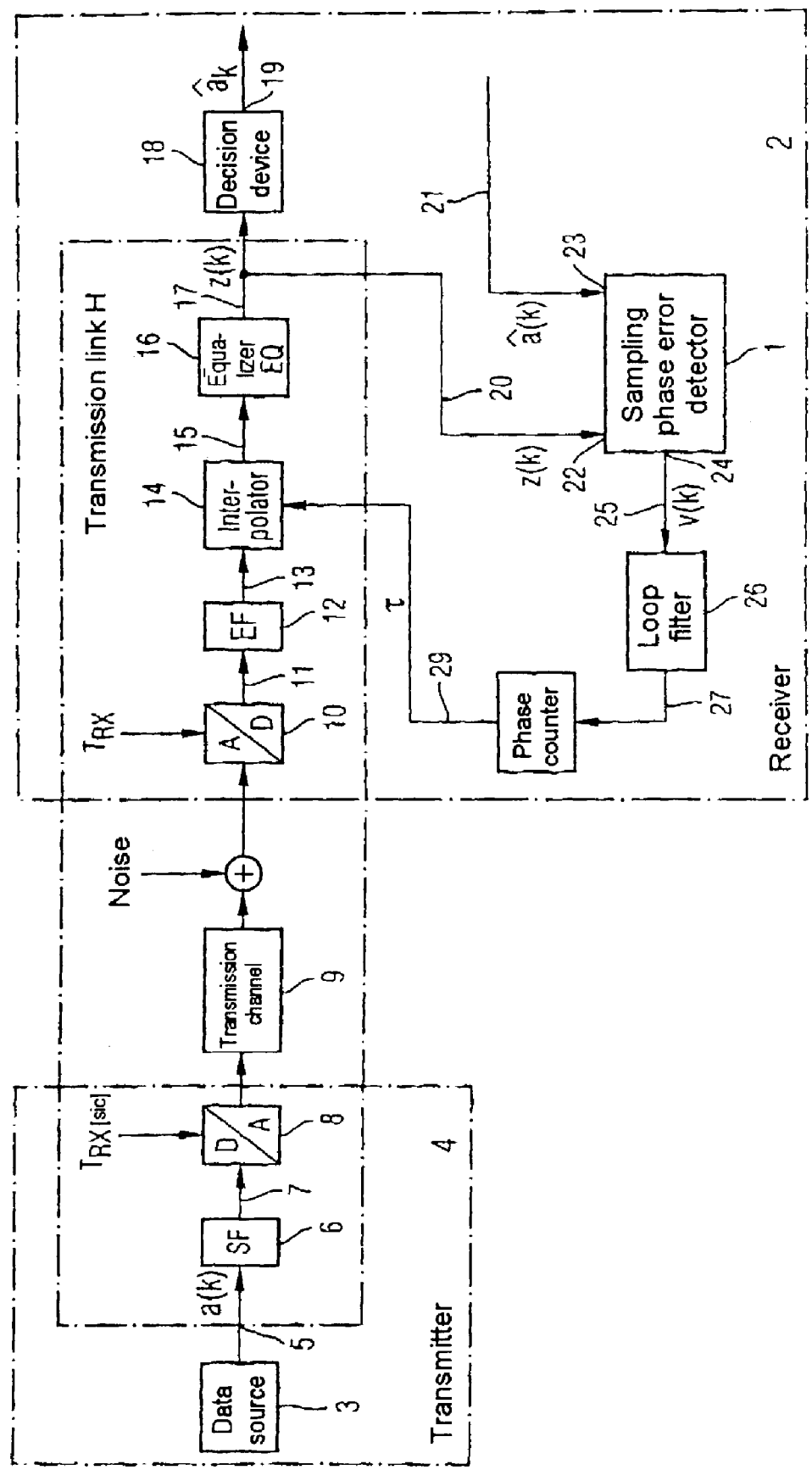
FIG. 9 shows a first receiver which operates with a freerunning operating cycle and includes the inventive sampling phase error detector.

FIG. 9 shows an inventive sampling phase error detector or a calculation circuit 1 for calculating a sampling phase error signal in the case of a possible application within a receiver 2.

Via a line 5, a data source 3 inside a transmitter 4 supplies transmitted data symbols a to a digital transmitting filter 6 for the purpose of transmitted pulse shaping. Via a line 7, a digital-to-analog converter 8 inside the transmitter 4 is connected downstream of the transmitting filter 6. The digital-to-analog converter 8 is operated with the aid of a symbol clock pulse $T_{TX}$. The analog-converted transmitted signal is transmitted by the transmitter 4 to a receiver 2 via a transmission channel 9. The data transmission channel 9 is a time-invariant data transmission channel, a line-bound data transmission channel. Noise is superimposed additively on the received signal.

The receiver 2 includes an analog-to-digital converter 10 which operates with the aid of a clock pulse $T_{RX}$. Connected downstream of the analog-to-digital converter 10 via a line 11 is a receive filter 12 which supplies the filtered signal to a downstream interpolator 14 via a line 13. The interpolator 14 is connected on the output side to an equalizer 16 via a line 15. The equalized received signal $z_k$ is supplied by the equalizer 16 via a line 17 to a decision device 18 which supplies digital estimates $â_k$ via a line for the purpose of further data processing within the receiver 2.

Via a line 20, the inventive sampling phase error detector 1 within the receiver 2 taps the digital received signal $z_k$ equalized by the equalizer 16, and, via a line 21, the digital estimates $â_k$ supplied by the decision device 18. The equalized digital signal $z_k$ passes via the line 20 to an input 22 of the sampling phase error detector 1. Moreover, the sampling phase error detector 1 has a further input 23 for receiving the digital estimates $â_k$. The sampling phase error detector 1 calculates a sampling phase error signal $v_k$ for the decision feedback clock phase regulation of the receiver 2. The sampling phase error signal $v_k$ is supplied by the sampling phase error detector 1 to a downstream loop filter 26 via a signal output 24 and a line 25. The loop filter 26 is connected to a downstream phase counter 28 via a line 27. The phase counter 28 is, for example, a numerically controlled oscillator. The phase counter 28 supplies a sampling phase error control signal τ to the interpolator 14 via a line 29. In the case of the embodiment illustrated in FIG. 9, the analog-to-digital converter 10 operates with a freerunning operating cycle. The correction of the sampling phase is performed by means of the interpolator 14. In the case of the decision feedback clock regulation provided in the receiver 2, the sequence of the noisy received signal $z_k$ is correlated with the noiseless sequence of the decided symbols $â_K$. The sampled received signal $z_k$ includes information on the sampling phase error. Since the adaptive equalizer 16 inside the receiver 2 is already adjusted, a correct decision $â_K=a_K$ is assumed for the estimates $â_K$ present at the output of the decision device 18. The sampling phase error detector 1 generates a sampling phase error signal $v_k$ as a function of the noiseless decided symbol $â_K$ and the noisy input signal $z_k$, the mean value of the sampling phase error signal $v_k$ $E[v(k)]=f(\tau)$ being approximately proportional to the sampling phase error τ. This sampling phase error signal $v_k$ is used as a criterion for the clock regulation.

In order to generate the sampling phase error signal v, the sampling phase error detector requires only a sequence of a few symbols $z_k$ or $e_k$ and $â_k$ of length L.

In the example illustrated in FIG. 9, the transmission link H comprises the transmitting filter 6, the digital-to-analog converter 8, the transmission channel 9, the analog-to-digital converter 10, the receive filter 12, the interpolator 14 and the equalizer 16. The transmission link H is characterized by its pulse response h(t).

Figure 10:
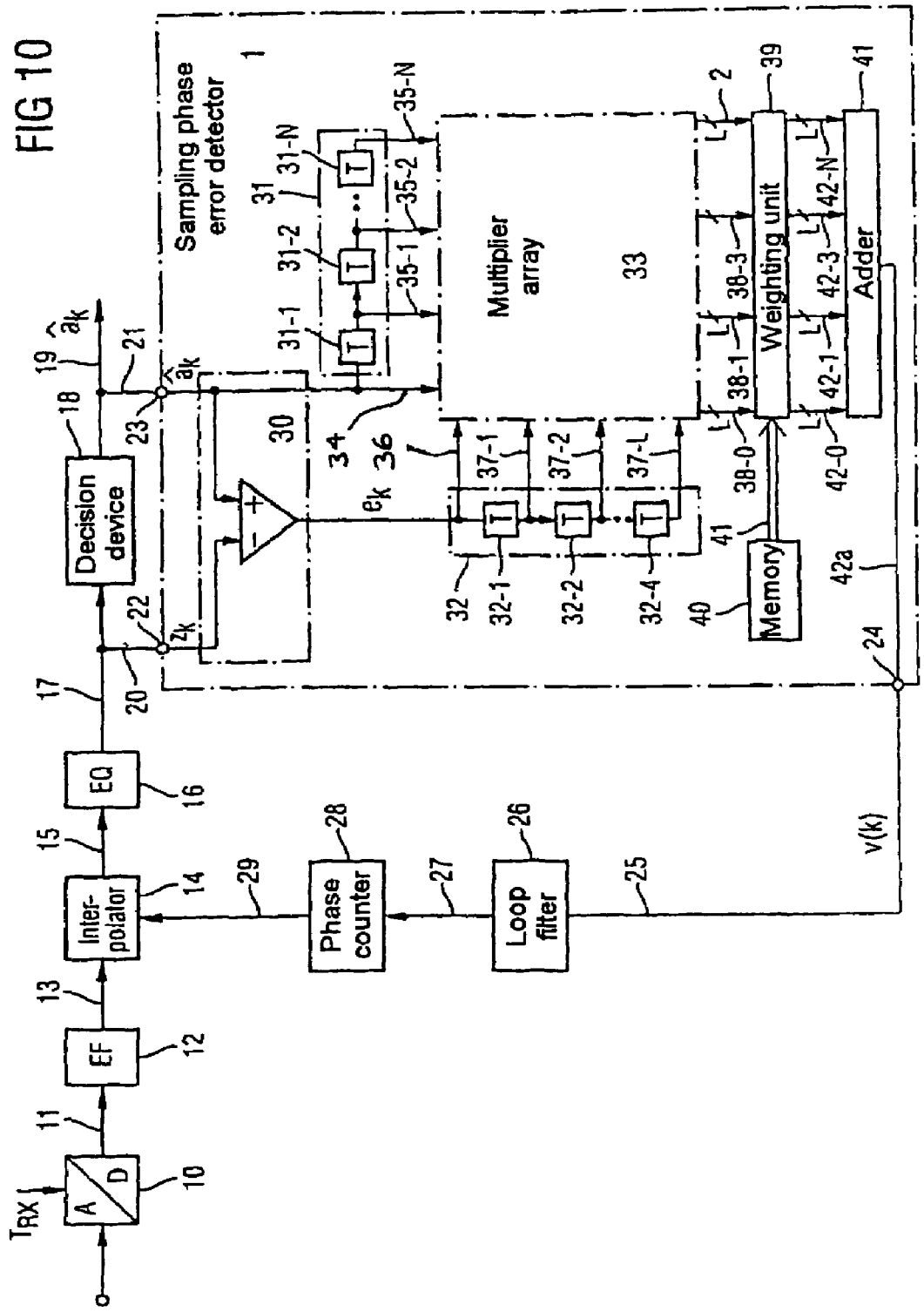
FIG. 10 shows the circuitry design of a calculation circuit in accordance with the invention.

FIG. 10 shows the circuitry design for a preferred embodiment of the inventive sampling phase error detector 1.

The inventive sampling phase error detector 1 or the calculating circuit 1 for calculating a sampling phase error signal v comprises in the case of the embodiment illustrated in FIG. 10 a subtraction circuit 30 which generates a differential signal $e_k$ between the digital received signal $z_k$, equalized by the equalizer, and the estimate $â_K$ formed by the decision device.

The calculation circuit 1 has a first delay element chain 31 and a second delay element chain 32. The first delay element chain 31 comprises N (N=L−1) delay elements 31-1, 31-2, ... 31-N. The second delay element chain 32 similarly comprises a plurality of serially connected delay elements 32-1, 32-2, 32-N. The first delay element chain 31 delays the digital estimate $â_k$ supplied by the decision device 18. The second delay element chain 32 delays the equalized differential signal $e_k$. In the case of an alternative embodiment, the equalized digital received signal $z_k$ is applied directly to the second delay element chain 32 without the interposition of a subtractor.

The calculation circuit 1 further comprises a multiplier array 33 which multiplies the undelayed digital estimate $â_k$ and the estimates which are delayed by the delay circuit 31 and are present at the outputs of the delay elements 31-$i$ by the equalized signal $e_k$ and by the output signal, delayed by the delay element chain 32, of all the delay elements 32-$i$ of the second delay element chain 32 to form product signals. For this purpose, the multiplier array 33 receives, via a line 34, the undelayed digital estimate signal $â_K$, via lines 35-$i$ the output signals of the delay elements 31-$i$ of the first delay element chain 31, via a line 36 the undelayed equalized differential signal $e_k$ and via lines 37-$i$ the output signals of the delay elements 32-$i$ of the second delay element chain 32. The multiplier array 33 comprises $L^2$ multipliers and $L^2$ signal outputs for supplying the product signals via lines 38 to a downstream weighting unit 39. The weighting unit 39 multiplies the product signals produced by the multiplier array 33 by adjustable weighting coefficients b. in a first embodiment, the weighting factors b are hard-wired. In an alternative embodiment, the weighting factors are adjustable and programmable. In the embodiment illustrated in FIG. 10, the weighting factors are stored in a programmable memory 40 and can be read out into the weighting unit 39 via lines 41. In a preferred embodiment, the memory 40 is externally programmable via an interface circuit (not illustrated).

As illustrated in FIG. 10, the sampling phase error detector 1 also has an adder 41, which receives the weighted product signals via lines 42 and adds them to the sampling phase error signal $v_k$. The output of the adder 41 is connected via a line 42 to the output 24 of the sampling phase error detector 1. In the embodiment of the receiver 2 illustrated in FIG. 10, the output signal of the sampling phase error detector 1 is filtered by the loop filter 26 and subsequently supplied to a phase counter 28 which supplies the interpolator 14 with a sampling phase error control signal via the line 29. The receiver illustrated in FIG. 10 has an analog-to-digital converter 10 with a freerunning operating cycle.

Figure 11:
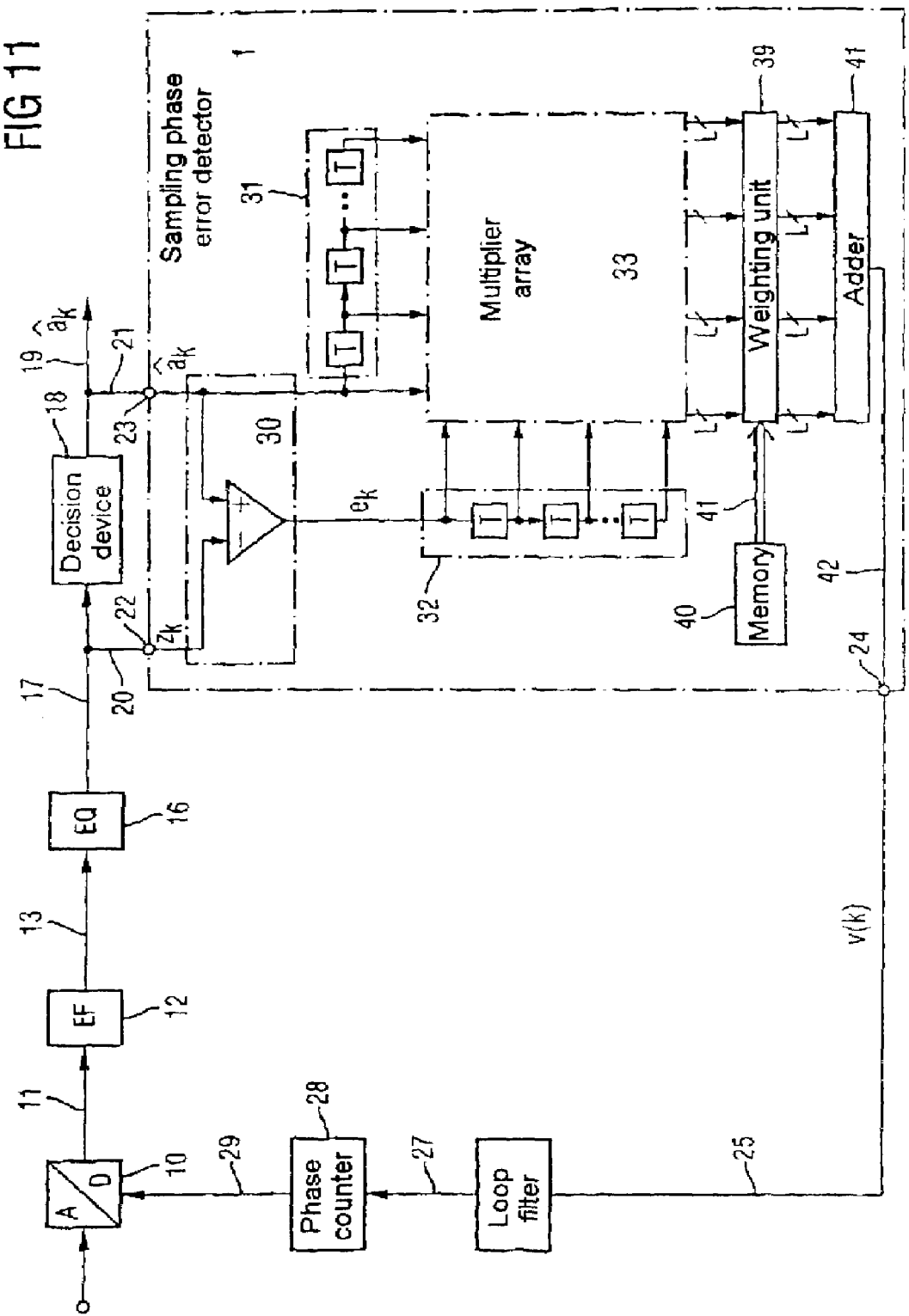
FIG. 11 shows a further receiver with the inventive calculation circuit, in the case of which the analog-to-digital converter is clocked by the sampling phase control signal.

The receiver 2 illustrated in FIG. 11 does not have a freerunning operating cycle, and the analog-to-digital converter 10 is driven by the phase counter 28 via the line 29. The circuitry design of the sampling phase error detector 1 is identical in both instances.

Figure 12:
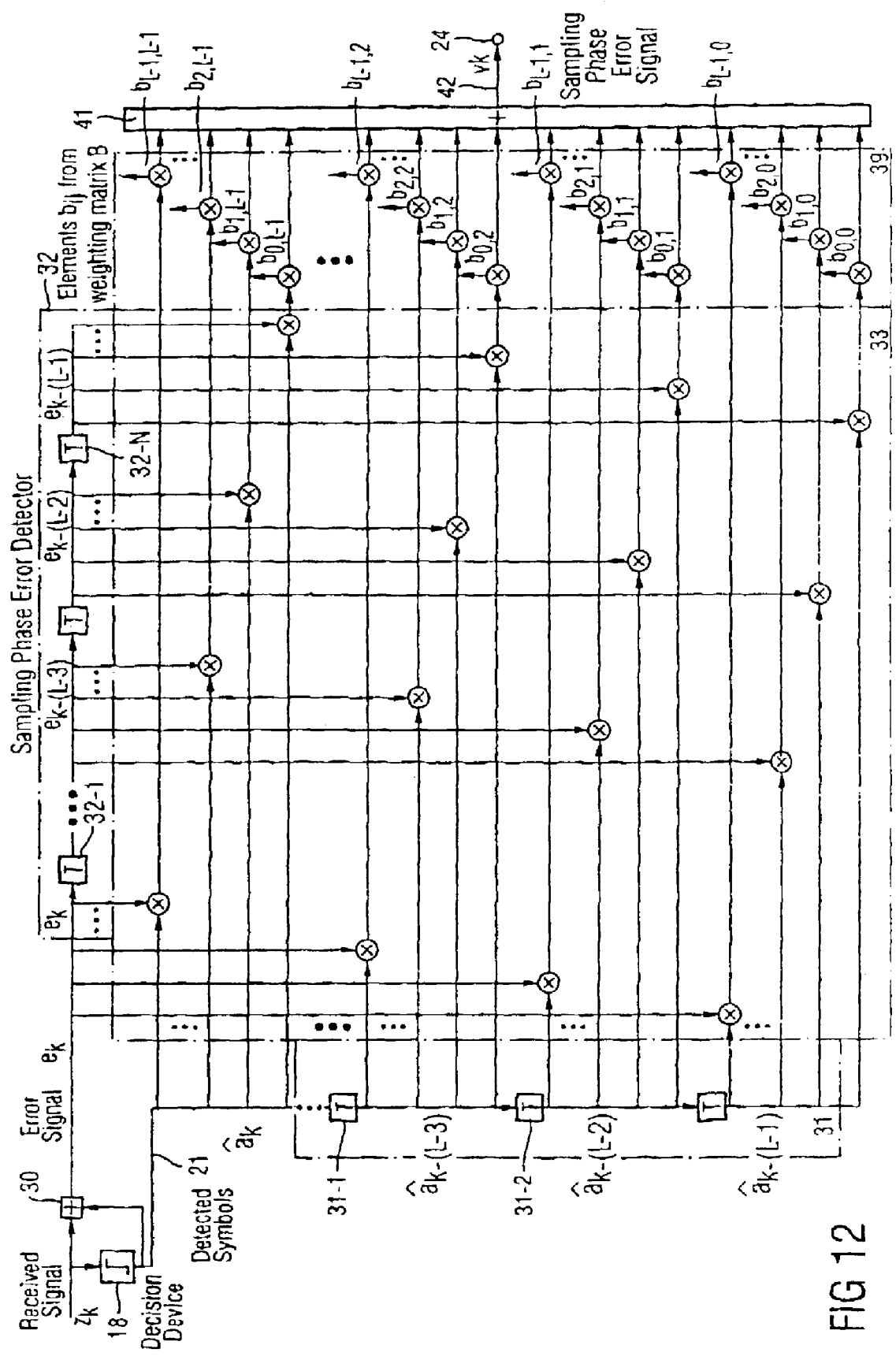
FIG. 12 shows a preferred embodiment of the inventive calculation circuit having an L×L multiplier array.

FIG. 12 shows a particularly preferred embodiment of the inventive calculation circuit 1 with an L×L multiplier array 33. In the embodiment illustrated in FIG. 12, the number of the serially connected delay elements 31-$i$ inside the first delay element chain 31, and of the delay elements 32-$i$ inside the second delay element chain 32 is N=L−1 in each case.

The delays of the signals $e_{k-i}$ in the delay element chain 32, and of the decided symbols $â_{k-j}$ of the delay element chain 31 are i and j clock pulses, respectively. The signals in the delay element chains 31, 32 are multiplied by one another in each case. The difference between the delays of the signals $e_{k-i}$ and $â_{k-j}$ which are multiplied by one another is i−j=x clock pulses.

There is a total of $L^2$ combinations or products which can be formed from the signals $e_{k-i}$ and $â_{k-j}$. All that is required is to multiply by one another so many combinations of the signals $e_{k-i}$ and $â_{k-j}$ that the clock difference i−j=x is present once in each case.

In a sampling phase error detector optimized with reference to the outlay on implementation and having an L×L multiplier array, the delay difference x can in principle assume the value range x=−(L−1) ... L−1. If the structure of the inventive sampling phase detector is optimized with reference to the minimal phase jitter, only L different values are implemented for the delay difference x. The value range for x is $$X = -((L-1)/2) \ldots (L-1)/2,$$

if L is odd, or $$x = -(L½) \ldots L ½,$$

if L is even.

The optimization possibilities with reference to the jitter reduction are fully utilized on the basis of the different arrangements of the components $B_{i,j}$, since the self-noise jitter depends strongly on which values on the secondary diagonals of the matrix are selected to vanish.

The multiplier array 33 comprises $L^2=(N+1)^2$ multipliers, which in each multiply an output signal of the first delay element chain 31 in relation to an output signal of the second delay element chain 32 to form product signals. The product signals are fed to the weighting unit 39, which likewise has $L^2$ multipliers for weighting the product signals. The weighting factors b of the weighting circuit 39 are preferably adjustable. They can be read out from the memory unit 40. The adder 41 adds the weighted product signals to the sampling phase error signal $v_k$.

The sampling phase error detector 1 illustrated in FIG. 12 can be described as follows:

$$v(\tau) = \left\{ [e_0(\tau) \; e_1(\tau) \; \cdots \; \cdots \; e_{L-1}(\tau)] \cdot \begin{bmatrix} b_{0,0} & b_{0,1} & b_{0,2} & \cdots & b_{0,L-1} \\ b_{1,0} & b_{1,1} & b_{1,2} & & \\ b_{2,0} & b_{2,1} & b_{2,2} & & \\ & & & \ddots & \\ b_{L-1,0} & & & & b_{L-1,L-1} \end{bmatrix} \cdot \begin{bmatrix} â_0 \\ â_1 \\ \vdots \\ \vdots \\ â_{L-1} \end{bmatrix} \right\} \quad (2)$$

or, in a simplified fashion:

$$v_k(\tau) = \sum_{i=0}^{L-1} e_{i+k} \sum_{j=0}^{L-1} â_{j+k} \cdot b_{i,j} \quad (3)$$

Here, $e_i(\tau)$ are the equalized differential values and $â_i$ are the symbols decided by the decision device 18.

If the noisy digital received signal $z_k$ is applied directly to the second delay element chain 32 without the interposition of the subtractor 30, the combination between the two sequences $z_k$ and the estimate $â_k$ in the decision feedback sampling phase error detector 1 can be described in general by a weighting matrix B with its elements $B_{i,j}$.

It holds that:

$V=z \times B \times â^T$; with $z=a \times H$ it follows that:

$V=z \times H \times B \times â$ and we obtain equation (4).

If the differential signal $e=z−â \times H$ is used instead of z, we obtain the equation (2).

$V=e \times B \times â^T$; with $e=a \times H − â \times T \times h$ it follows that:

$V=(a \times H − â \times I \times h_0) \times B \times â^T$

The elements on the primary diagonals of the matrix are omitted in equation 4.

The overall system can be described by the following equation for the case in which $z_k$ and $â_k$ are input signals of the sampling phase detector:

$$v(\tau) = \left\{ [a_0 \ a_1 \ \cdots \ \cdots \ a_{L-1}] \cdot \begin{bmatrix} h_{0,0}(\tau) & h_{0,1}(\tau) & h_{0,2}(\tau) & \cdots & h_{0,L-1}(\tau) \\ h_{1,0}(\tau) & h_{1,1}(\tau) & h_{1,2}(\tau) & & \\ h_{2,0}(\tau) & h_{2,1}(\tau) & h_{2,2}(\tau) & & \\ & & & \ddots & \\ h_{L-1,0}(\tau) & & & & h_{L-1,L-1}(\tau) \end{bmatrix} \cdot \begin{bmatrix} b_{0,0} & b_{0,1} & b_{0,2} & \cdots & b_{0,L-1} \\ b_{1,0} & b_{1,1} & b_{1,2} & & \\ b_{2,0} & b_{2,1} & b_{2,2} & & \\ & & & \ddots & \\ b_{L-1,0} & & & & b_{L-1,L-1} \end{bmatrix} \cdot \begin{bmatrix} \hat{a}_0 \\ \hat{a}_1 \\ \vdots \\ \vdots \\ \hat{a}_{L-1} \end{bmatrix} \right\} \quad (4)$$

The above equation likewise results in the case when $e_k$ and $\hat{a}_K$ are input signals for the phase detector, the matrix elements $h_{0,0}$, $h_{1,1}$, $h_{2,2}$ ... assuming the value 0, however.

The equivalent time-discrete channel pulse response h(t) of the transmission link H is specified by the matrix H($\tau$) with its elements $h_{m,n(\tau)}$.

The mean value of the sampling phase error signal E[v(k)], that is to say the timing function f($\tau$), results in this general case as:

$$f(\tau) = E[v(k)] = E[a^2] \cdot \sum_{i=1}^{L} \sum_{k=1}^{L} h_{i,k}(\tau) \cdot b_{k,i}$$

k≠i, when $e_k$ instead of $z_k$ is applied to the inventive sampling phase detector.

The sampling phase error detector 1 illustrated in FIG. 12 is a sampling phase error detector which can be used universally and offers all degrees of freedom for any desired applications.

Further sampling phase error detectors optimized for specific applications can be systematically derived starting from the sampling phase detector 1 according to the invention which can be used universally and is illustrated in FIG. 12.

The following is to be borne in mind regarding the weighting matrix B specified in equation 4 and regarding the implementation of this matrix B in terms of circuitry as illustrated in FIG. 12:

The size and the dimension of the matrix B is a function of the length L of the pulse response h(t) of the transmission link H. If the (appreciable) duration of the pulse response h(t) is five clock cycles, for example, the multiplier array 33 comprises, for example, five times five multipliers ($L^2$), that is to say in each case N=4 for the number of the delay elements within the delay element chains.

The coefficients on of the [sic] diagonals and of the [sic] axes parallel to the primary diagonals are equal within the pulse response matrix H, that is to say the pulse response matrix H has a so-called Töplitz structure. The coefficients on the diagonals of the weighting matrix B correspondingly also have equal values.

At least one weighting coefficient is required on each secondary diagonal of the weighting matrix B for a functioning sampling phase regulation.

In a preferred embodiment, all the coefficients of the primary diagonal of the weighting matrix vanish, and there is only one nonvanishing coefficient per column of the weighting matrix.

Figure 13A:
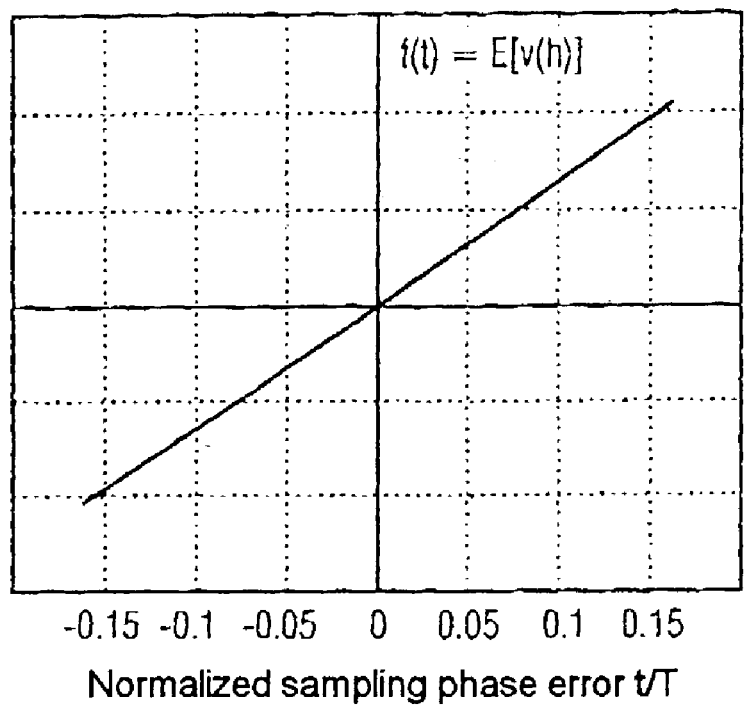
FIG. 13a shows an ideal characteristic line of a sampling phase error detector.

The weighting coefficients are preferably adjusted in such a way that an ideal characteristic line such as is illustrated in FIG. 13a results.

If a plurality of coefficient values on a diagonal are nonvanishing, this has no additional effect with reference to the jitter signal reduction, since this effect can already be achieved by the loop filter 26.

The fewer nonvanishing coefficient values the weighting matrix B has, the fewer estimates $\hat{a}_k$ and received signal values $z_k$ are correlated, and the fewer multipliers need be provided in the multiplier array 33 and in the weighting circuit 39. After an optimization has been undertaken, it is therefore possible for the sampling phase error detector 1, such as it is illustrated in FIG. 12, to be reduced to simpler circuits.

The sampling phase error detector in accordance with the invention generates a sampling phase error signal $v_k$ whose mean value is approximately proportional to the difference between the unknown correct sampling phase To and the current estimate $\hat{\tau}$:

$$\tau = \tau_0 - \hat{\tau}$$

The mean value of the sampling phase error signal $E[v_n]$ is a magnitude approximately proportional to the sampling error and which can be used according to the invention as a criterion for the clock regulation. FIG. 13a shows the mean value of the sampling phase error signal $v_k$. The ideal characteristic line, illustrated in FIG. 13, of the sampling phase function f($\tau$) has a unique zero crossing for the optimal sampling phase $\tau$=0. The sampling phase function is monotonically rising and ideally symmetrical with reference to the point of origin.

Figure 13B:
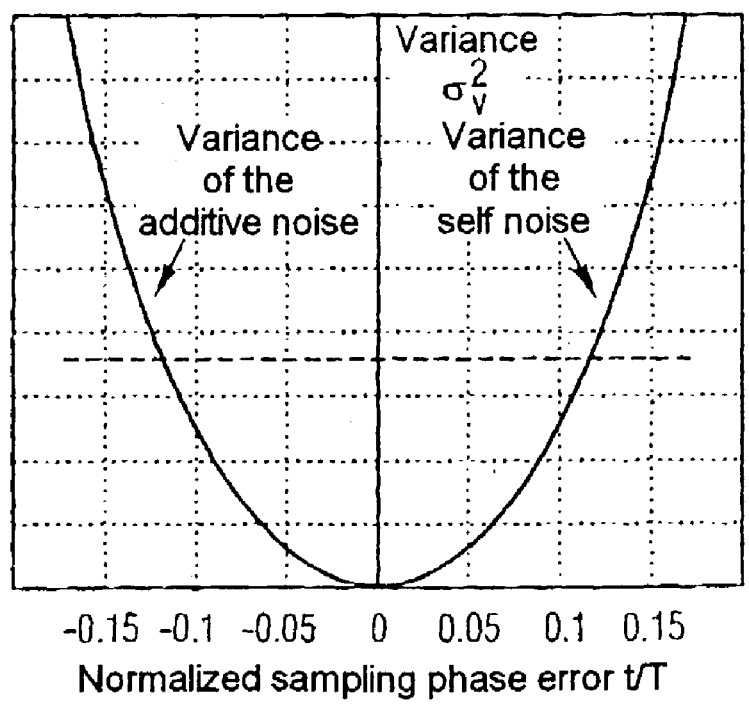
FIG. 13b shows the variance or the jitter of the output signal of a sampling phase error detector.

FIG. 13b shows the variance or the jitter of the sampling phase error signal $v_k$. The variance of the output signal of the sampling phase detector 1 designates the quality of the sampling phase error detector. The variance is a measure in this case of the mean quadratic error which is made when estimating the sampling error by the sampling phase error detector. The mean quadratic error is proportional to the phase jitter.

The noise interference in the clock regulation loop is caused by two sources of the jitter. These two components of the noise are also denoted as additive noise and self noise. The additive noise or the random jitter is caused by all the noise signals and interference signals which are contained in the received signal of the receiver. The so-called self noise is caused by a systematic jitter which is generated in the sampling phase error detector 1 itself. The reason for this systematic jitter resides in the fact that the sampling phase error signal $v_k$ is generated with the aid of the input signals $\hat{a}$ and $z_k$, which are based on a sequence of random values $\hat{a}_k$.

FIG. 13b shows the principle of the profile of the variance of the sampling phase error signal. If the sampling phase error is $\tau=0$, the component of the variance caused by the systematic jitter is smallest and ideally is equal to zero. The variance grows with the sampling phase error $\tau$. During operation of the inventive regulation loop, the sampling phase $\hat{\tau}$ varies by the ideal value $\tau_0$, and so self noise occurs. The additive noise component is always present irrespective of the sampling phase error. During an ideal adjustment of the inventive sampling phase error detector 1 such as is illustrated in FIG. 12, for example, the decision feedback clock regulation loop has a minimum jitter in the steady state. As a consequence of this, the bit error rate BER of the received signal is likewise minimal.

The variance of the self noise of the sampling phase error detector in the clock regulation loop can be described as follows.

$$\sigma_{va}^2 = E[a^4] \cdot \sum_{i=1}^{L} \left( \sum_{k=1}^{L} h_{i,k} \cdot b_{k,i} \right)^2 + E^2[a^2] \cdot \left( \sum_{i=1}^{L} \sum_{j=1}^{L} \left( \sum_{k=1}^{L} h_{i,k} \cdot b_{k,i} \right)^2 + \sum_{i=1}^{L} \sum_{j=1}^{L} \left( \sum_{k=1}^{L} h_{i,k} \cdot b_{k,i} \sum_{l=1}^{L} h_{i,j} \cdot b_{i,l} \right) - 3 \cdot \sum_{i=1}^{L} \left( \sum_{k=1}^{L} h_{i,k} \cdot b_{k,i} \right)^2 \right). \quad (7)$$

The sample of the pulse response $\hat{a}_{i,k}$ are [sic] a function of the sampling phase in this case.

The variance of the additive noise is likewise a function of the weighting matrix B. In the case when the additive noise is white noise with the variance $\sigma n^2$, it is:

$$\sigma_{va}^2 = E[a^2] \cdot \sigma_n^2 \cdot \sum_{i=0}^{L} \sum_{j=0}^{L} b_{i,j}^2 \quad (8)$$

The jitter of the inventive sampling phase detector 1 can be calculated for various weighting matrices B and systematically minimized, since the pulse response $h(\tau)$ of the time-invariant transmission link is generally known.

The sampling phase error detector illustrated in FIG. 12 can be reduced to simpler circuits for specific applications. In the example illustrated in FIG. 14a, there is provided a greatly simplified multiplier array 33 which multiplies the output signal of the second delay element of the first delay element chain 31 by the undelayed differential value $e_k$ and by the output signal of all the delay elements of the second delay element chain 32 to produce product signals. In the case of this simplified structure, the result is the circuit illustrated in FIG. 14a, which is equivalent to the circuit illustrated in FIG. 14b.

Figure 15A:
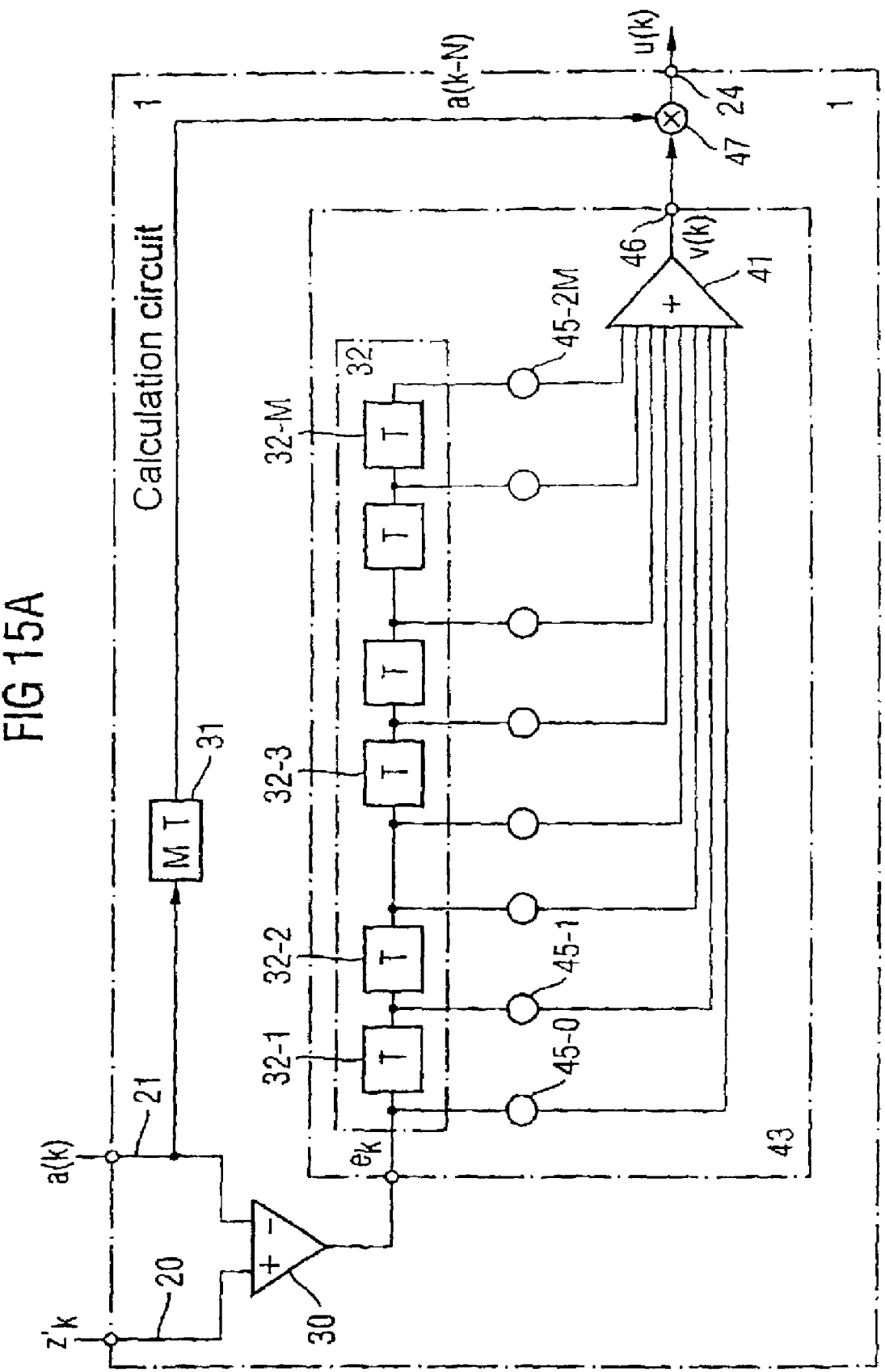
FIG. 15a shows a first implementation of the embodiment, illustrated in FIG. 14b, of the inventive sampling phase error detector.

This yields a circuit structure which corresponds to the circuit structure, illustrated in FIG. 15a, of the calculation circuit 1. This circuit structure has already been described in German Patent Application DE 10212913.4, to the description of which reference is hereby made. In the special case, illustrated in FIG. 15a, of the inventive calculation circuit 1 as illustrated in FIG. 12, the error signal $e_k$ is led via a linear, preferably antisymmetrical digital filter asymmetric pulse responses [sic], and the filter output signal is subsequently correlated with the decided symbol values $\hat{a}_k$.

The timing function F [sic] (of $\tau$) is [sic] of the calculation circuit illustrated in FIG. 15a is described by the following equation:

$$f(\tau) = \sum_i c_i \cdot h_i(\tau);$$

with $c_i = b_{i,\frac{L-1}{2}}$

The function $f(\tau)$ is determined by the samples of the pulse response $h_i(\tau)=h(i\times T+\tau)$ and the freely selectable coefficients $$TRk \; c_i = b_i \frac{L-1}{2}$$

of the FIR filter. The synchronization type illustrated in FIG. 15a is adapted in this way to different pulse shapes $h(t)$.

Figure 1:
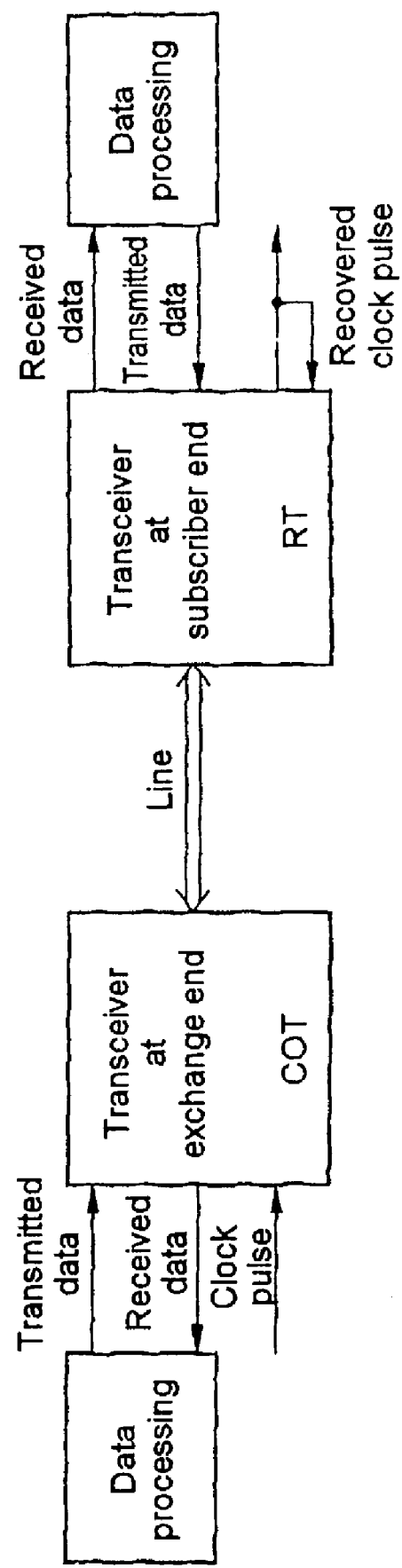
FIG. 1 shows a data transmission system according to the prior art.
Figure 2:
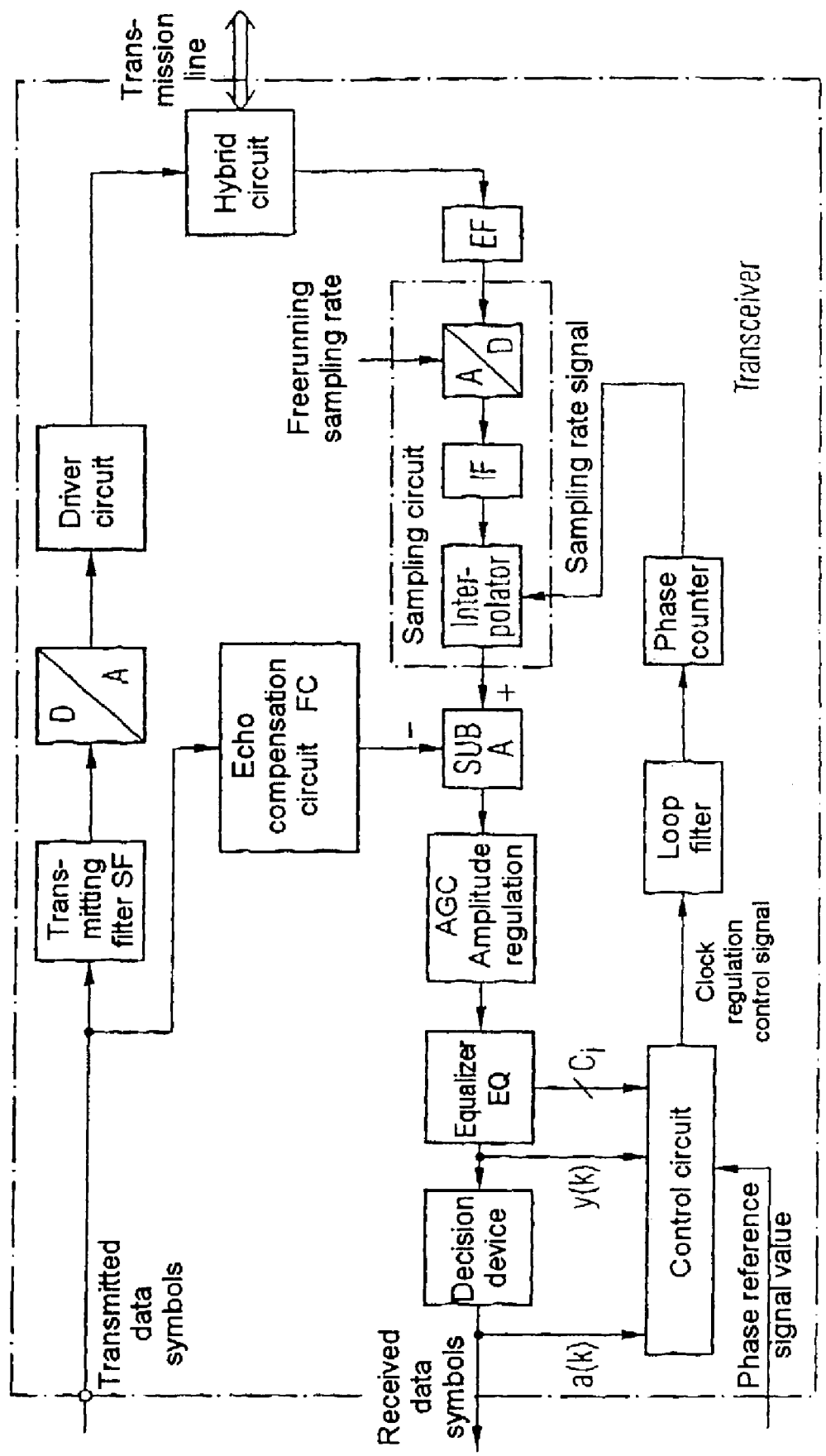
FIG. 2 shows a transceiver according to the prior art.
Figure 3:
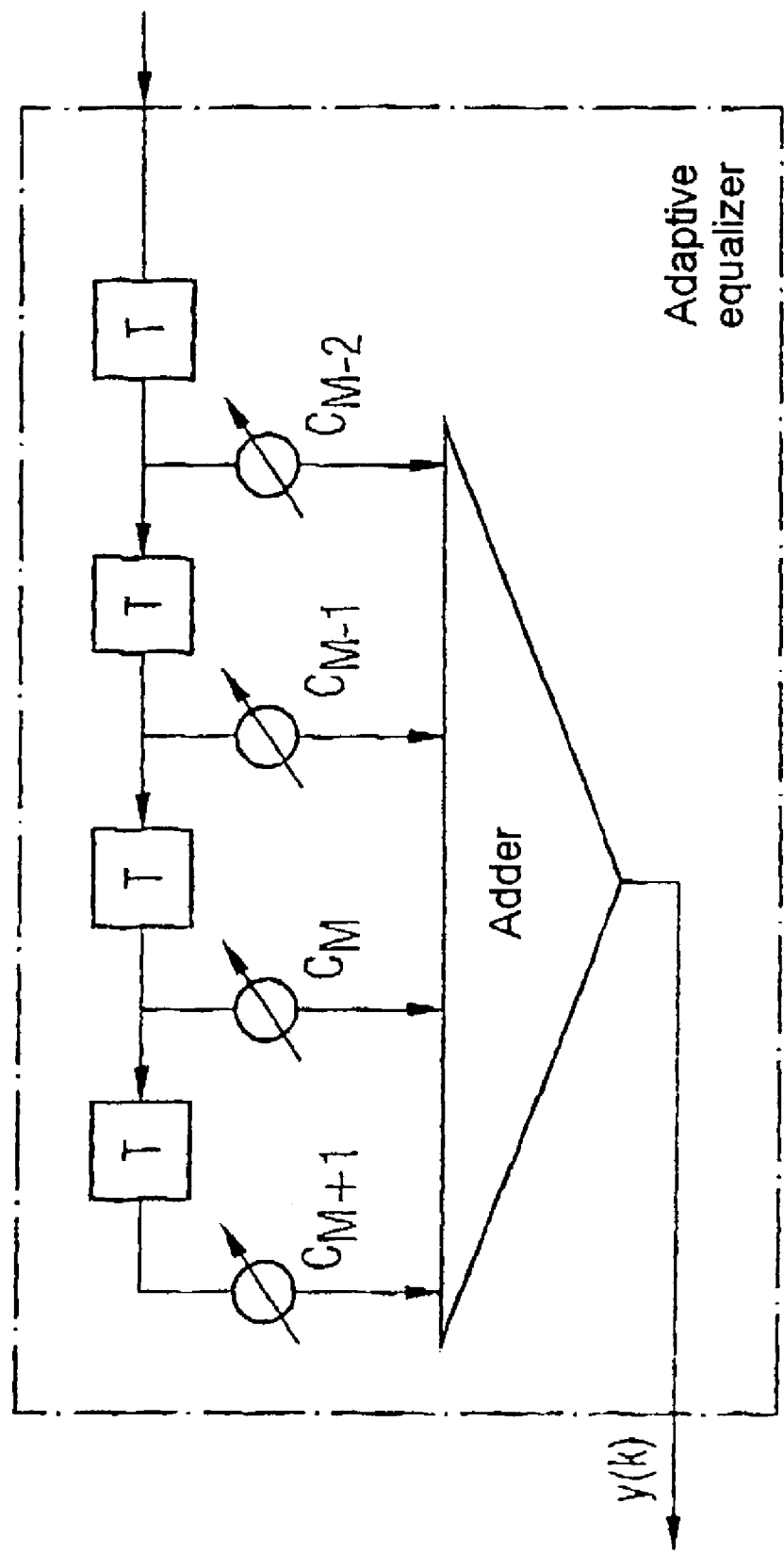
FIG. 3 shows an adaptive equalizer, included in the transceiver, according to the prior art.
Figure 15B:
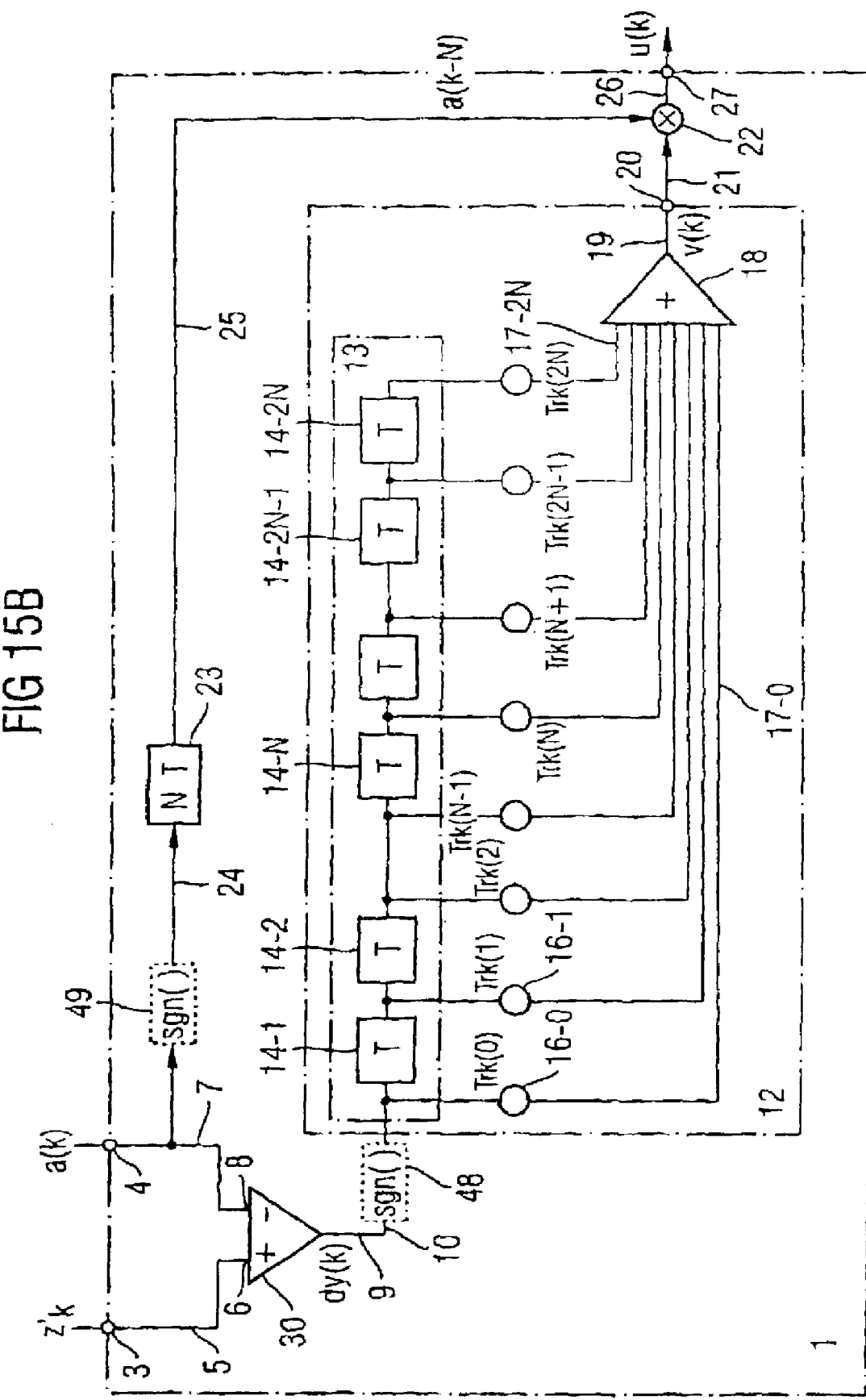
FIG. 15b shows a further implementation of the embodiment, illustrated in FIG. 14b, of the inventive sampling phase error detector.

The inventive calculation circuit 1 as illustrated in FIG. 15 serves, for example, for calculating a clock regulation criterion $v_k$ for a clock phase regulation circuit of a transceiver as illustrated in FIG. 2. The calculation circuit 1 in accordance with FIG. 15a is rotated inside the control circuit and generates the clock regulation criterion u.

The calculation circuit 1 includes the subtraction circuit 30, which forms a differential signal $e_k$ between an equalized digital received signal $z_k$ and a digital estimate signal $\hat{a}_K$ that has been formed. For this purpose, the calculation circuit 1 has a first signal input for applying the digital received signal $e_k$ equalized by an equalizer, and a second signal input for applying the estimate signal $\hat{a}_K$ formed by a decision device. The first signal input for the equalized digital received signal $e_k$ is applied to a first signal input of the subtraction circuit 30 via an internal line. The second input of the calculation circuit is connected to a second input of the subtraction circuit 30 via an internal line. The subtraction circuit 30 forms the differential signal $e_k$ between the digital received signal $z_k$ and the estimate signal $\hat{a}_K$ formed by the decision device 18, and supplies it to an input of a nonrecursive digital filter 43 via an output and a line. The nonrecursive digital filter 43 serves for filtering the applied differential signal $e_k$. The nonrecursive digital filter 43 inside the inventive calculation circuit 1 includes a delay element chain 32-2 composed of serially connected delay elements **32-*i*. The number of the delay elements 32-*i* is 2×M+1. The output signals of the delay elements 32-*i* are respectively fed via lines to multipliers 45-*i* which multiply the output signals of the delay elements by adjustable weighting coefficients b. The output signals of the delay elements 32-*i* weighted by the weighting or filter coefficients b are fed via lines to an adder 41 which adds the weighted delay element output signals to a digital filter output signal. The digital filter output signal formed is applied to an output 46 of the nonrecursive digital filter 43 via a line. The output 46 of the nonrecursive digital filter 43 is connected to a further multiplier 47** via [lacuna] line.

The calculation circuit 1 further includes a delay circuit 31. The delay circuit 31 receives the digital estimate signal $â_K$ which is generated by the decision device 18, and delays it by the delay time M×T of the delay elements up to the delay element M situated in the middle. The estimate signal $â_k$ temporarily delayed by the delay circuit 31 is fed via a line 48 to the multiplier 47, which multiplies the output signal of the delay circuit 31 by the digital filter output signal of the nonrecursive digital filter 43 to form a clock regulation criterion u(k) which is supplied to the output 24 of the calculation circuit 1 via an internal line.

The delay elements **32-*i* within the delay element chain 32 are clocked at the symbol clock rate (T) of the digital received signal. The number of the delay elements 32-*i* within the delay element chain 32 is preferably, but not necessarily, odd. The number of the delay elements 32-1 [sic] within the delay element chain 32 is 2×M+1, N being approximately three in preferred embodiments of the inventive calculation circuit 1. The clock regulation criterion u(k) formed constitutes the value of the convolution of the received pulse response with the pulse response of the nonrecursive filter 43** with the filter coefficients 6 at the instant t=m×T.

In the case of the inventive calculation circuit 1, the filter coefficient b(M) for the output signal of the delay element 32-M situated in the middle within the delay element chain 32 is set to zero. The filter coefficients for the remaining delay elements **32-*i* within the delay element chain 32** preferably have values which exhibit point symmetry in relation to the filter coefficients b(M) situated in the middle, when the pulse h(t) is symmetrical.

For M=3, the delay element chain 32 includes seven delay elements (N=2M+1), and the nonrecursive digital filter 43 has seven adjustable filter coefficients b. The values of the filter coefficients of a filter coefficient set preferably exhibit point symmetry relative to the Mth filter coefficient b(M) for the delay element 32-3 situated in the middle.

In the case of the inventive calculation circuit 1, a possible filter coefficient set is:

$b(i)=(-1,-1,-1,0,1,1,1)$

A further possible coefficient set for the inventive calculation circuit 1 is:

$b(i)=(-1,+1,-1,0,+1,01,+1)$

FIG. **15*b* shows a further preferred embodiment of the inventive calculation circuit 1. In the case of the preferred embodiment illustrated in FIG. 15*b***, instead of the digital estimate signal $â_K$ use is made only of the sign thereof, and instead of the differential signal $e_k$ use is made only of the sign $e_k$ thereof.

The calculation circuit 1 in the case of the embodiment illustrated in FIG. 15 includes a first sign circuit 48, which is connected downstream of the subtraction circuit 30. The sign circuit 48 detects the sign of the differential signal formed by the subtraction circuit 30, and supplies only the sign to the downstream, nonrecursive digital filter 43.

The calculation circuit 1 illustrated in FIG. 15 further includes a second sign circuit 49, which is connected upstream of the delay circuit. The sign circuit 49 detects the sign of the digital estimate signal $â_K$ and supplies the sign to the delay circuit 31. In the case of the embodiment illustrated in FIG. **15*b* as well, the filter coefficient b(M) for the delay element 32-M** situated in the middle is set to zero, and the remaining filter coefficients are dimensioned or set with regard to as good a startup and jitter response as possible, the filter coefficients being adjusted substantially with point symmetry relative to the filter coefficient b(M).

Figure 6A:
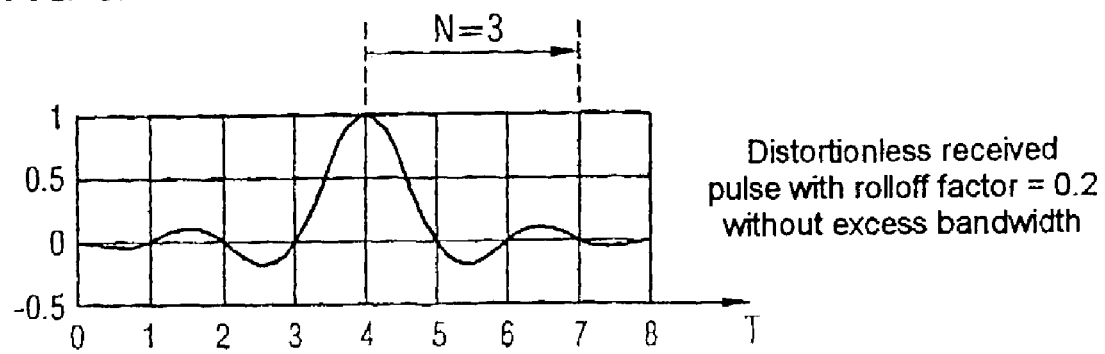
FIGS. 6A, 6B, and 6C show pulse responses for a distortionless data transmission system with a rolloff factor of 20%.
Figure 6B:
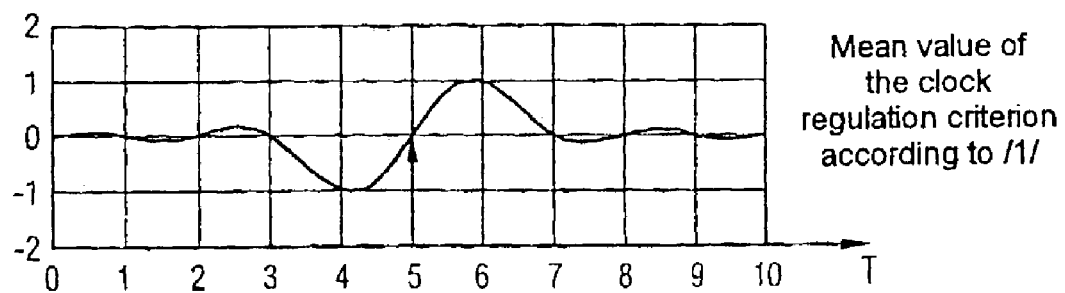
Figure 6C:
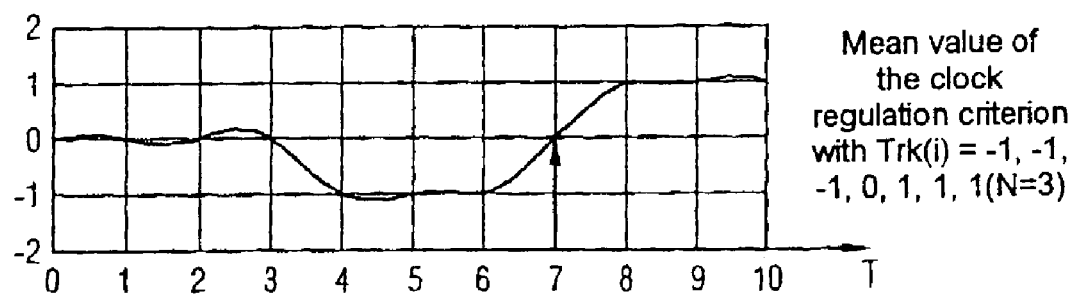

FIG. **6*c* shows the profile of the mean value of the clock regulation criterion u(k), calculated by the calculation circuit 1, for M=3, that is to say for a delay element chain 32 with seven delay elements 32-*i*, the filter coefficient set of the example illustrated in FIG. 6*c*** being:

$b(i)=(-1,-1,-1,0,1,1,1).$

As may be seen from FIG. **6*c*, the profile of the mean value exhibits a monotonically rising zero crossing by the ideal sampling instant 7×T (with a time delay of n=3×T by comparison with the maximum of the distortionless received pulse). Consequently, in the case of a distortionless received pulse with a rolloff factor of 0.2 and a data transmission system without excess bandwidth, the clock phase regulation of the inventive calculation circuit is stable just as with the conventional clock phase regulation circuit as illustrated in FIG. 6*b***.

Figure 7A:
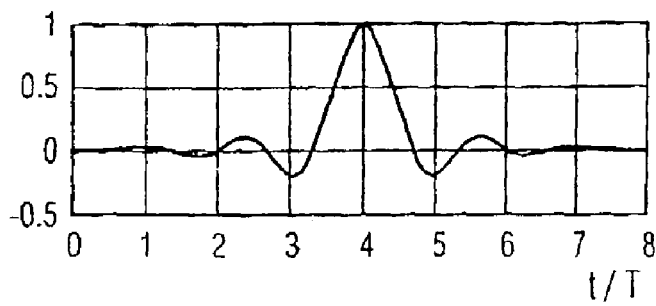
FIGS. 7A, 7B, and 7C show pulse responses for an unequalized data transmission system with a rolloff factor of 20% and an excess bandwidth of 50%.
Figure 7B:
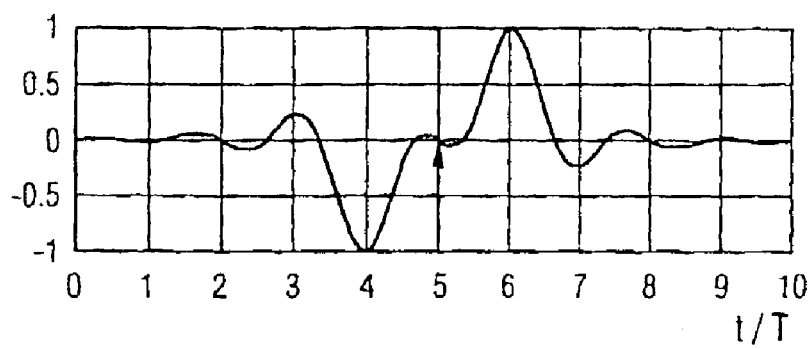
Figure 7C:
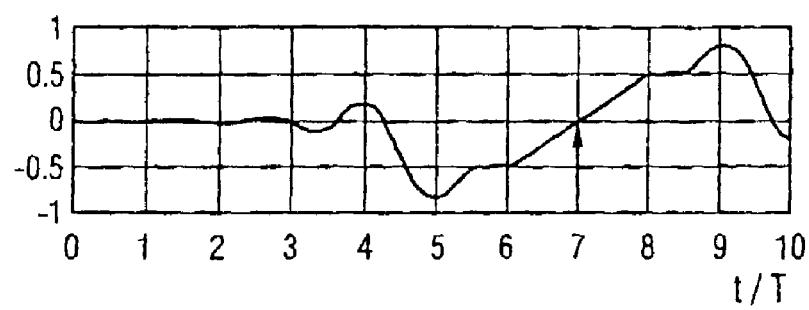

FIG. 7 shows the case of an equalized received pulse with a rolloff factor of 0.2 in the case of an excess bandwidth of 50%. As already set forth above, the clock phase regulation, which [lacuna] a conventional calculation circuit as illustrated in FIGS. **5*a*, 5*b*, unstable, as follows from the S-shaped profile of the mean value about the sampling instant in accordance with FIG. 78*b*** [sic].

FIG. **7*c* shows the profile of the mean value of the clock regulation criterion u, calculated by the inventive calculation circuit 1 in accordance with FIG. 15, for N=3, that is to say for a nonrecursive digital filter 43 with seven delay elements 32-*i* within the delay element chain 32**, and for the following filter coefficient set:

b(i)=(0; −1; −0.7; 0; +0.7; 1; 0;). As is clearly to be seen from FIG. **7*c***, the calculated mean value of the clock regulation criterion u has a monotonically rising zero-crossing profile about the sampling instant 7×T (that is to say with a time delay of 3×T by comparison with the maximum of the pulse response of the received pulse). The characteristic line of the clock phase regulation is therefore approximately linear and therefore stable in the time region of interest, that is to say about the ideal sampling instant.

Figure 8A:
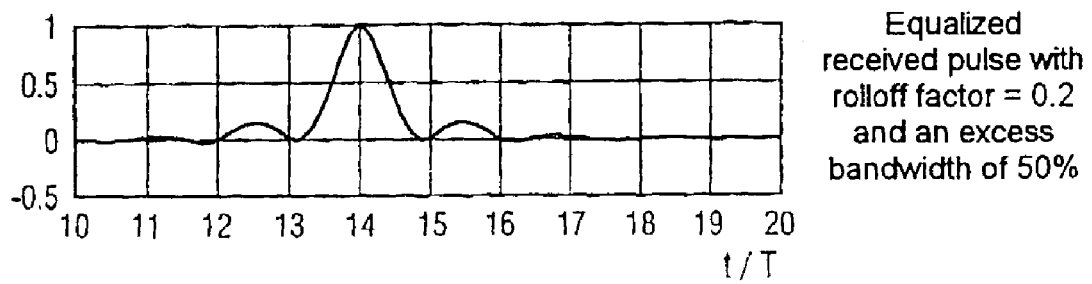
FIGS. 8A, 8B, and 8C show pulse responses for an equalized data transmission system with a rolloff factor of 20% and an excess bandwidth of 50%.
Figure 8B:
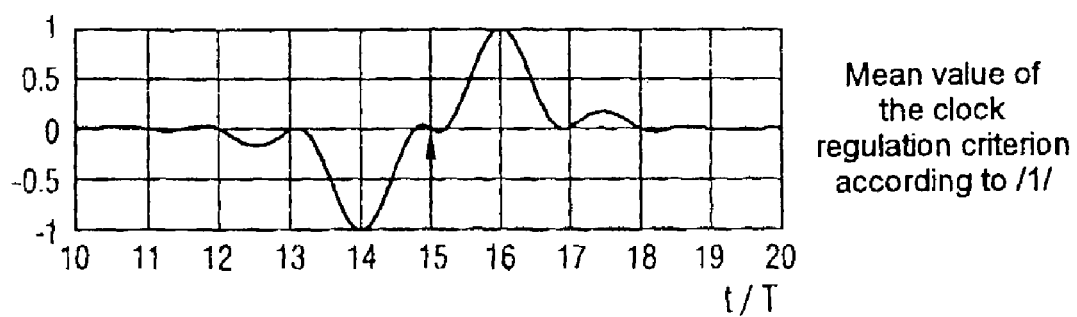
Figure 8C:
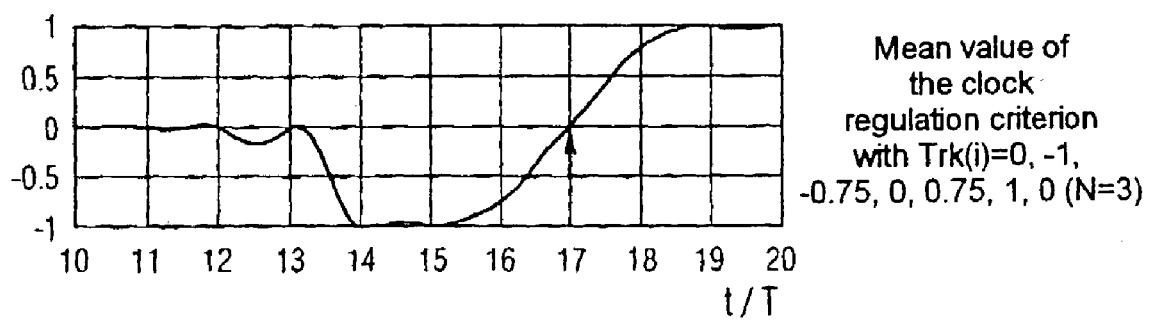

FIG. 8a shows the case of a received pulse, equalized by an equalizer circuit, with a rolloff factor of 0.2 and an excess bandwidth of 50%. As can be seen from FIG. 9c [sic], the profile of the mean value of the clock regulation criterion, calculated by the inventive calculation circuit 1, is likewise monotonically linearly rising and therefore stable in the region of the sampling instant for M=3 and the following filter coefficient set:

$$b(i)=(0;-1;-0.75;0;0.75;1;0).$$

Because of the phase linearity of the received pulse, completely symmetrical pulse responses result in all cases. The coefficients of the clock regulation criterion filter 43 are therefore selected with point symmetry relative to the filter coefficient Trk(n) for the delay element 32-M situated in the middle. Since linear amplitudes and delay distortions, that is to say line distortions, distortions of transmitting and receive filters, always occur in real data transmission systems, corresponding received pulse responses which are asymmetric relative to the instant of the pulse maximum also result. Consequently, the filter coefficients b(i) of the nonrecursive digital filter 43 need not be selected with exact point symmetry relative to the time index M in this case. Independently thereof, the filter coefficient b(M) is always set to zero. Owing to the dimensioning of the filter coefficients b(i), the zero crossing is monotonically rising or falling in relation to the time of the sampling instant. In this case, the filter coefficients b(i) are preferably adjusted in such a way that the zero crossing runs as steeply as possible. The zero crossing is preferably adjusted to be as steep as possible with reference to the control of the clock regulation criterion so that as low as possible a phase jitter occurs.

Figure 4:
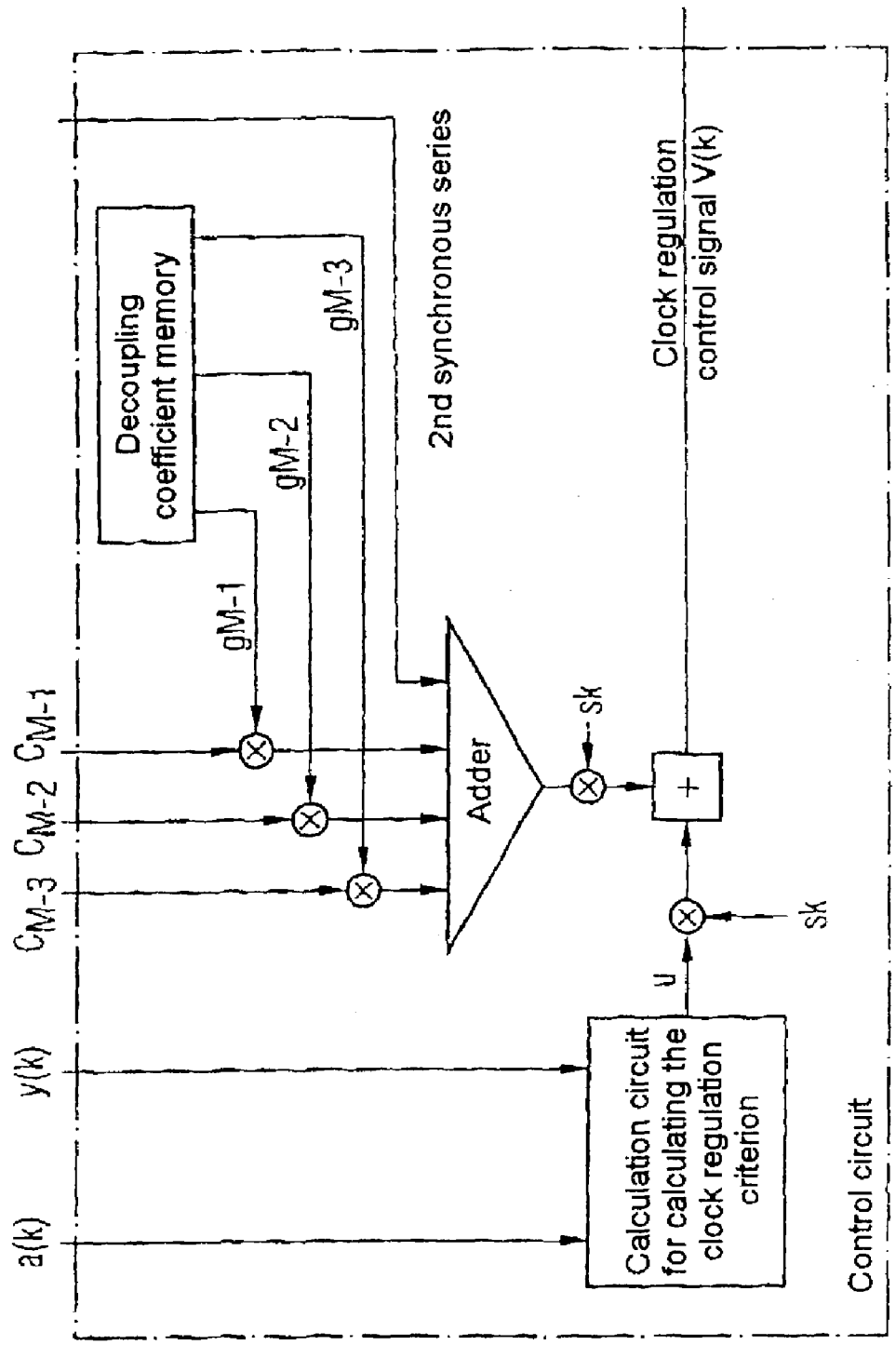
FIG. 4 shows a control circuit, included in the conventional transceiver, according to the prior art.
Figure 5A:
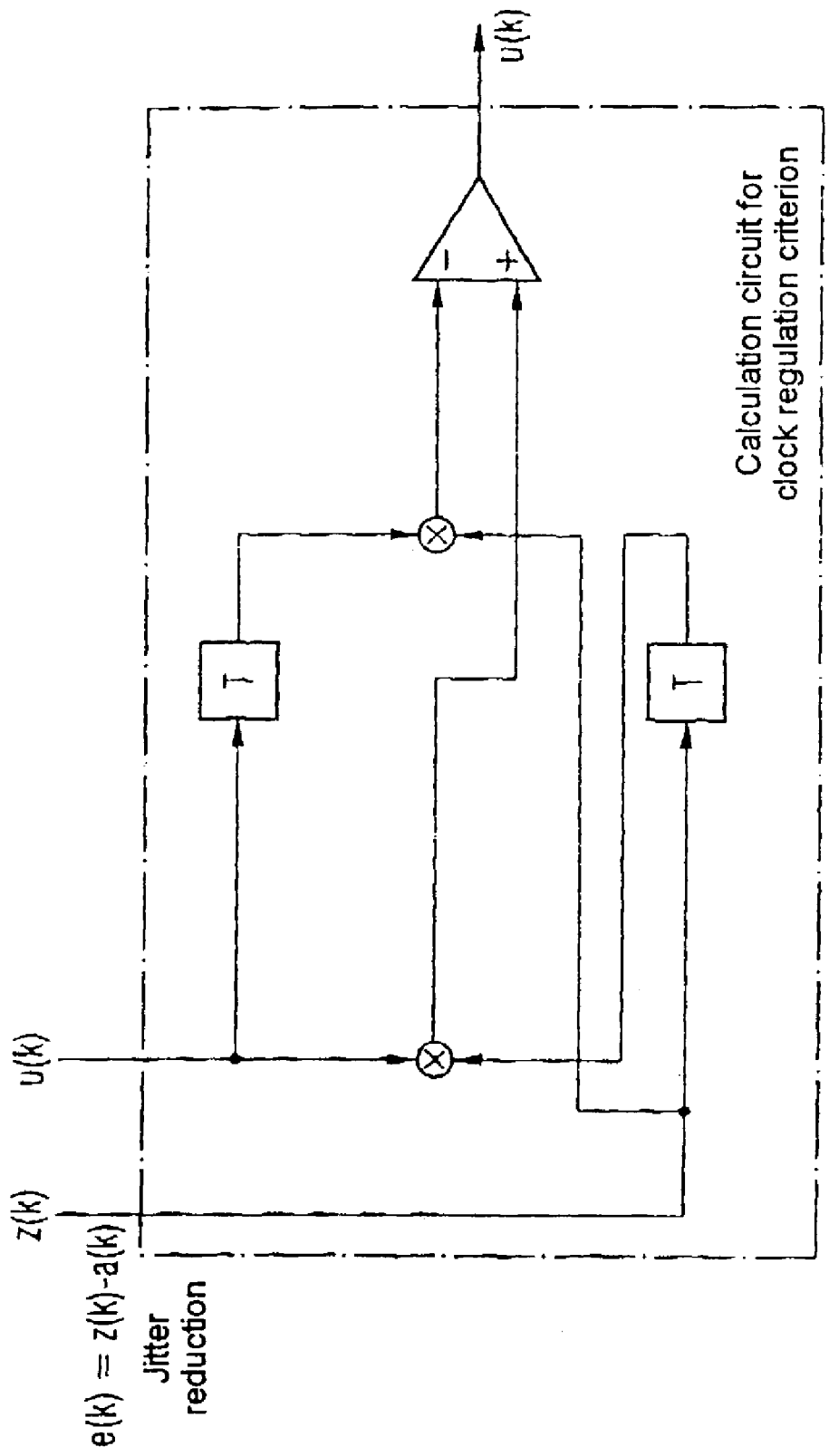
FIGS. 5a, 5b show calculation circuits for calculating the clock regulation criterion, according to the prior art.
Figure 5B:
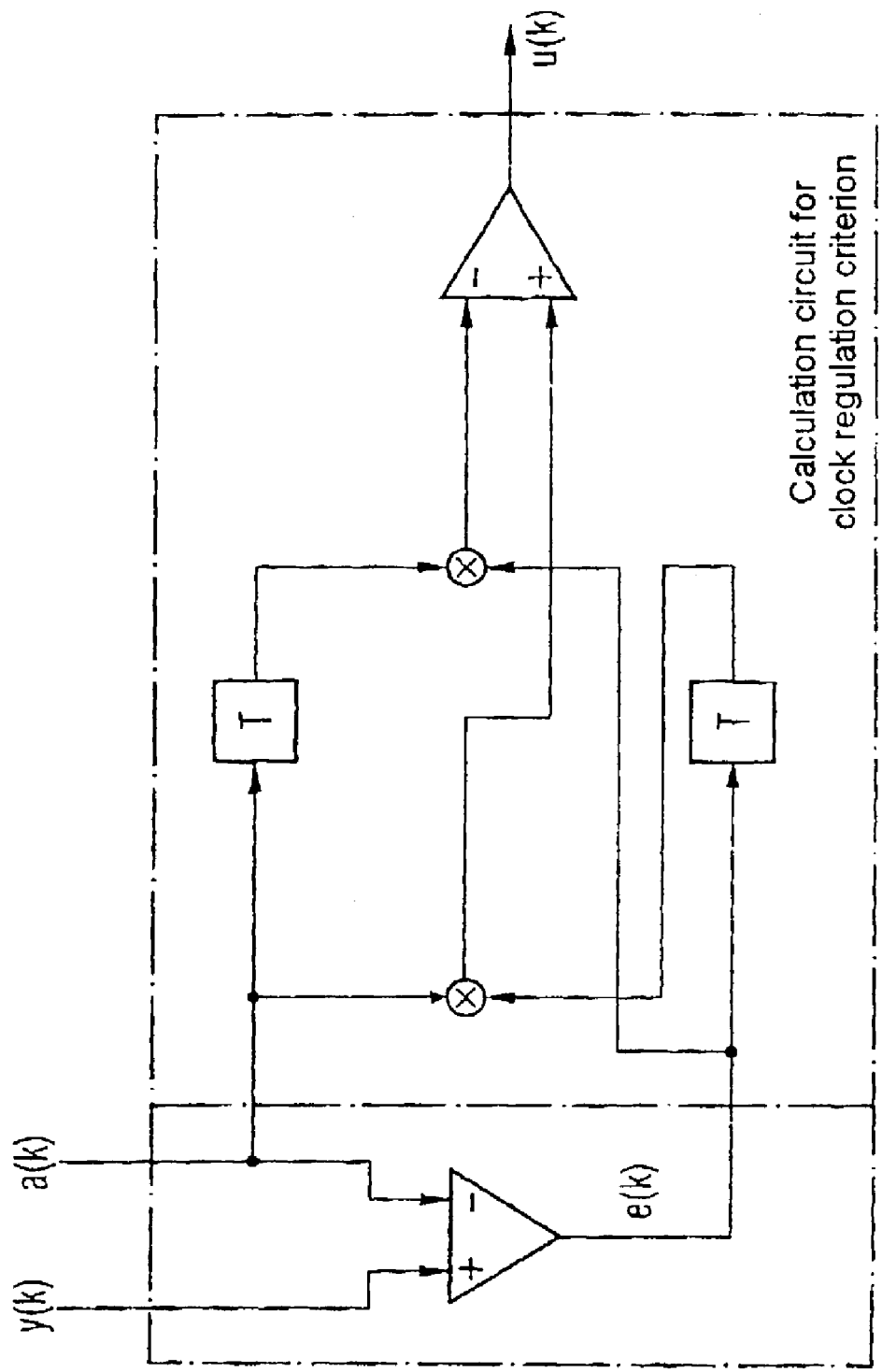

As illustrated in FIG. 4, the clock regulation criterion formed by the inventive calculation circuit 1 is preferably subsequently scaled and added to the decoupling signal by means of an adder to form a clock regulation control signal for the loop filter. The filter coefficients $C_i$ of the adaptive equalizer inside the transceiver are multiplied by the stored coupling coefficients $g_i$ and added by the adder to the phase reference signal value to form the decoupling signal. The decoupling signal is scaled and added to the clock regulation criterion u(k), formed by the inventive calculation circuit 1, to form the clock regulation control signal. The exact position of the sampling instant can be prescribed by the addition of the phase reference signal value. Whereas in the case of data transmission systems without excess bandwidth the first coefficient upstream of the main coefficient of the linear equalizer suffices for generating the decoupling signal, in the case of data transmission systems with excess bandwidth use is made of a plurality of filter coefficients of the adaptive equalizer for the purpose of generating the decoupling signal. In a similar way as in the case of the filter coefficients of the nonrecursive digital filter 12, the weighting coefficients are dimensioned for generating the decoupling signal as a function of the data transmission system, in particular of the spectral shape of the transmitted signal and the power distortion to be expected.

Figure 16A:
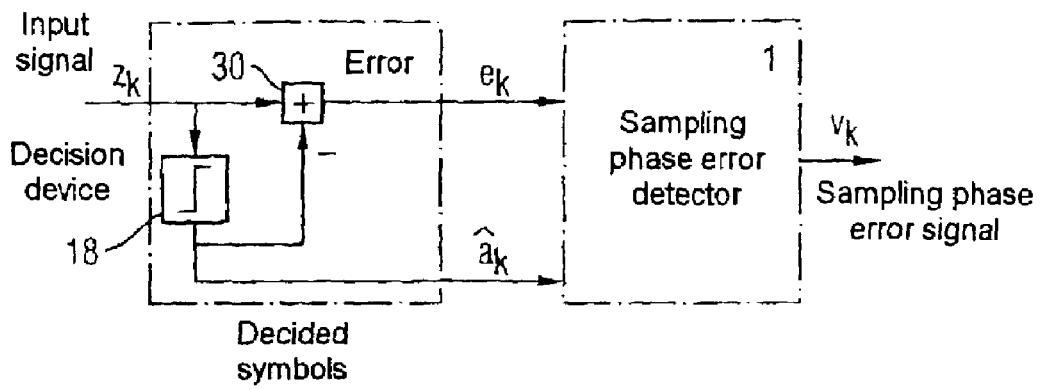
FIGS. 16a, 16b, 16c show different implementation variants of the inventive sampling phase error detector.
Figure 16B:
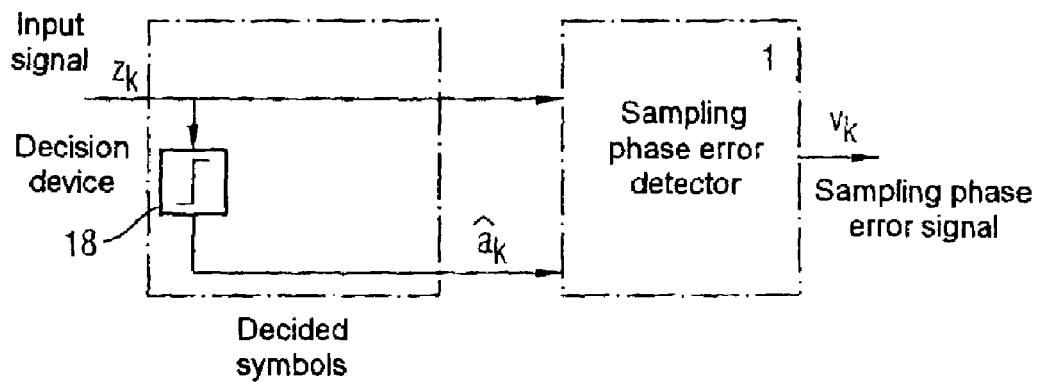

FIGS. 16a, 16b show various implementation variants of the inventive sampling phase error detector 1. Provided in FIG. 16a is a subtraction circuit 30 which is missing in the implementation in FIG. 16b. In the case of the embodiment illustrated in FIG. 16b, the received signal $z_k$ is fed directly to the sampling phase error detector 1 without the interposition of the subtraction circuit.

Figure 16C:
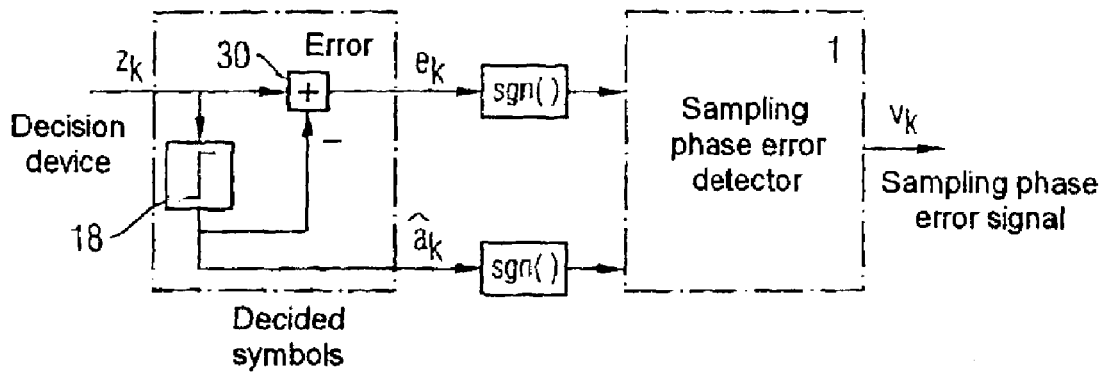

FIG. 16c shows as an implementation variant in which sign detection circuits are provided.

Figure 17:
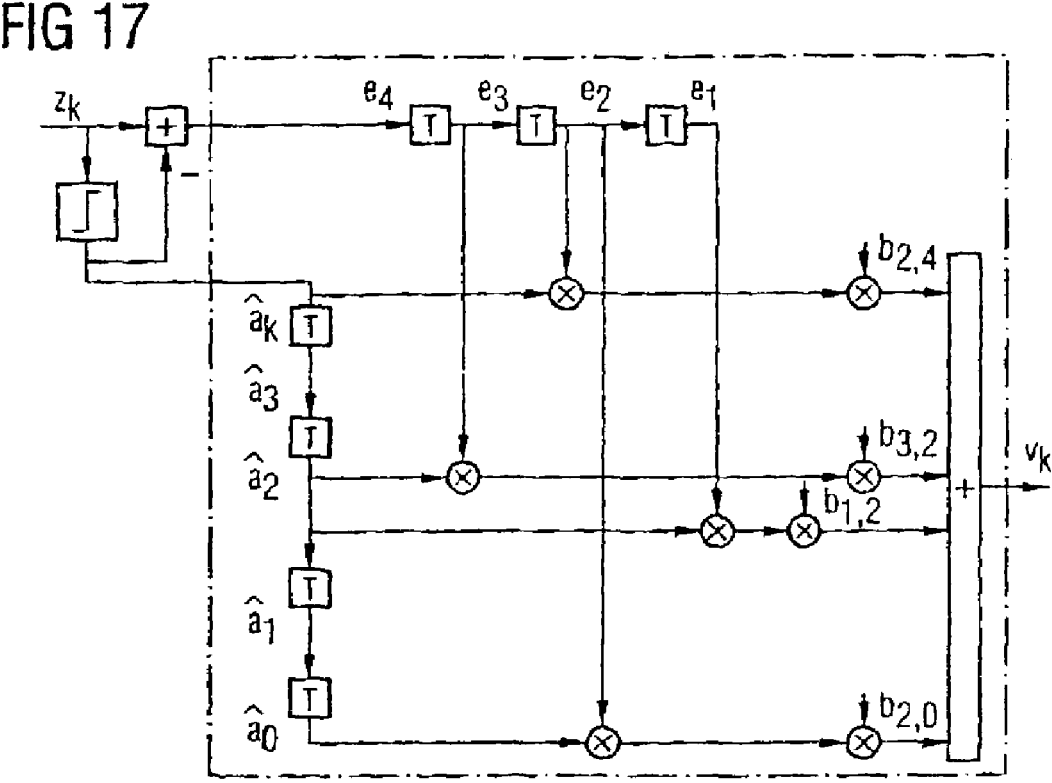
FIG. 17 shows an optimized sampling phase error detector in accordance with the invention for a raised cosine pulses [sic] with α=0.5.
Figure 18A:
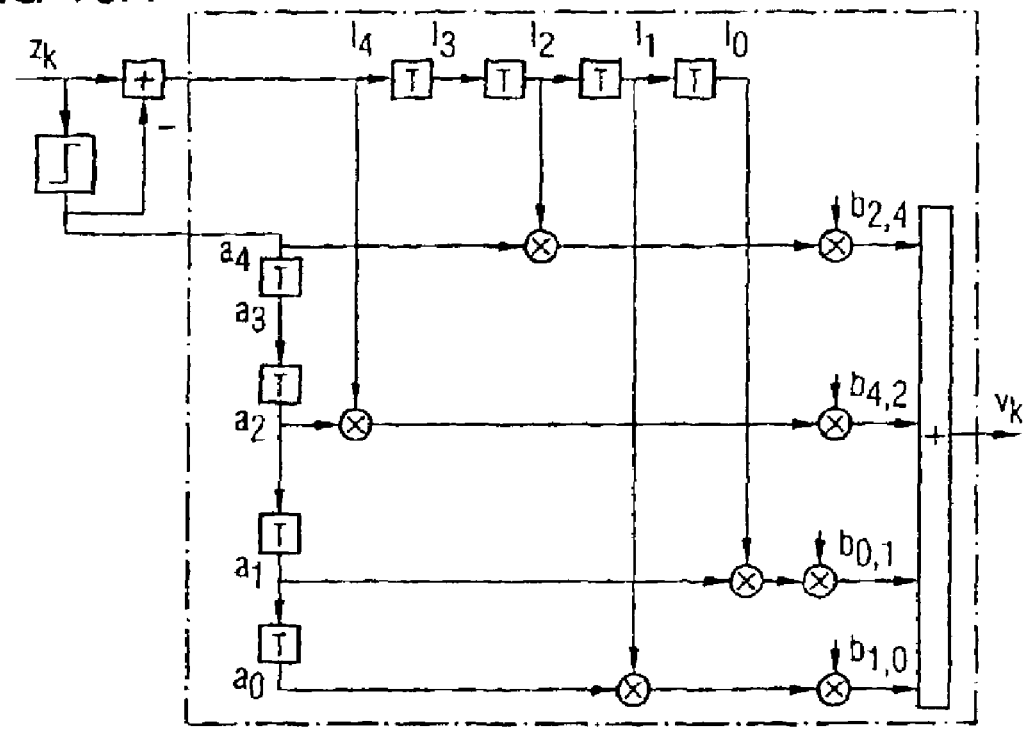
FIGS. 18a, 18b, 18c show further implementation variants of the inventive sampling phase error detector for a raised cosine pulses [sic] a =0.5.
Figure 18B:
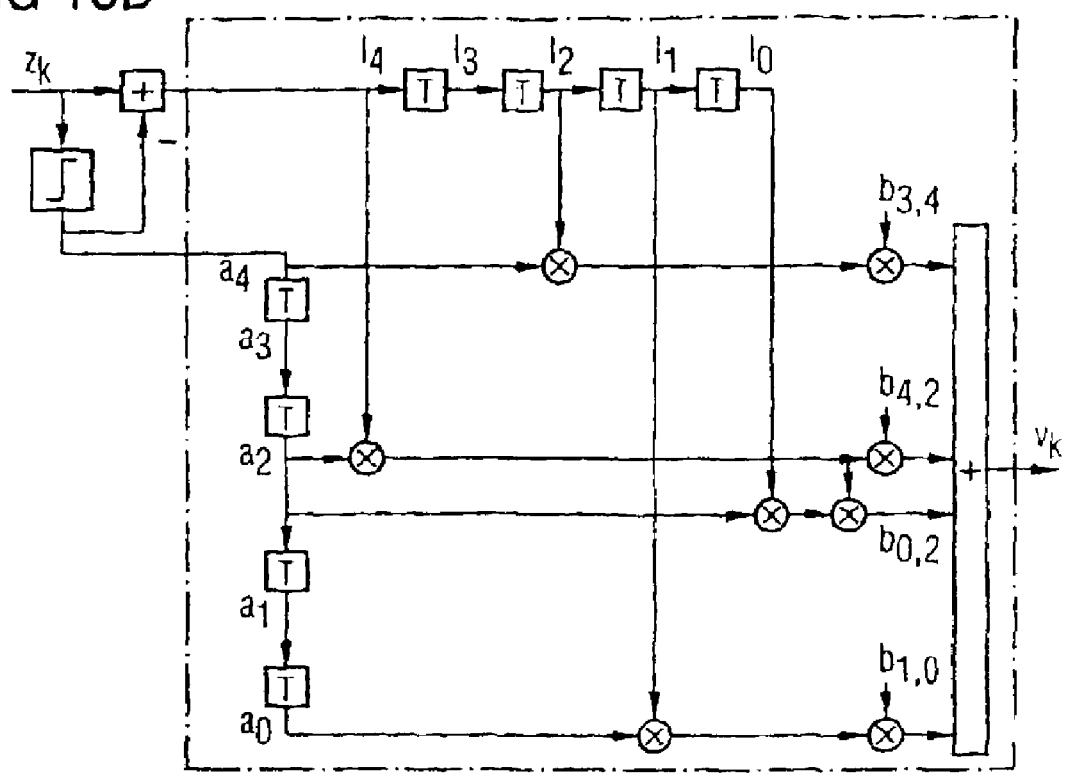
Figure 18C:
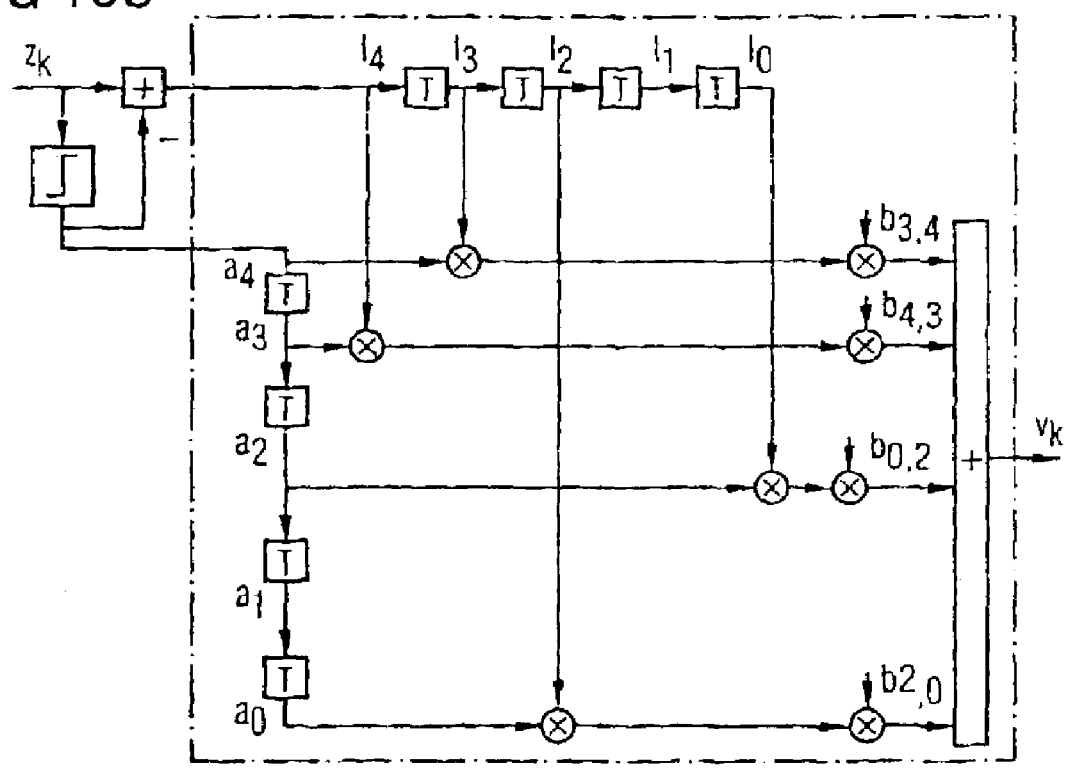

FIG. 17 shows as an example an optimized sampling phase error detector 1 in accordance with the invention for a raised cosine pulses [sic] with $\alpha=0.5$. In this case, the L×L (=5×5) multiplier array has been simplified to such an extent that only the multipliers of the L−1=4 coefficients which do not vanish are provided. The coefficients $b_{ik}$ are freely selectable as in the example which illustrates a sampling phase detector based on an FIR filter. The optimized weighting coefficients $b_k$ are a function of the pulse shape h(t) and the additive noise, that is to say of the SNR of the received signal. In the case of small SRN values, the coefficients $b_k$ are equal to the derivative h of the samples [lacuna] pulse response h(t) of a raised cosine filter with $\alpha=0.5$, for example $b_{2,4}=-0.21$; $b_{1,2}=1$; $b_{3,2}=-1$; $b_{2,0}=0.21$. FIGS. 18a, 18b, 18c show further possible implementation variants of a sampling phase error detector 1 in accordance with the invention for a raised cosine pulses [sic] with $\alpha=0.5$.

The inventive sampling phase error detector can be used to optimize a clock regulation loop for minimizing the jitter in a multiplicity of applications.

Figure 19A:
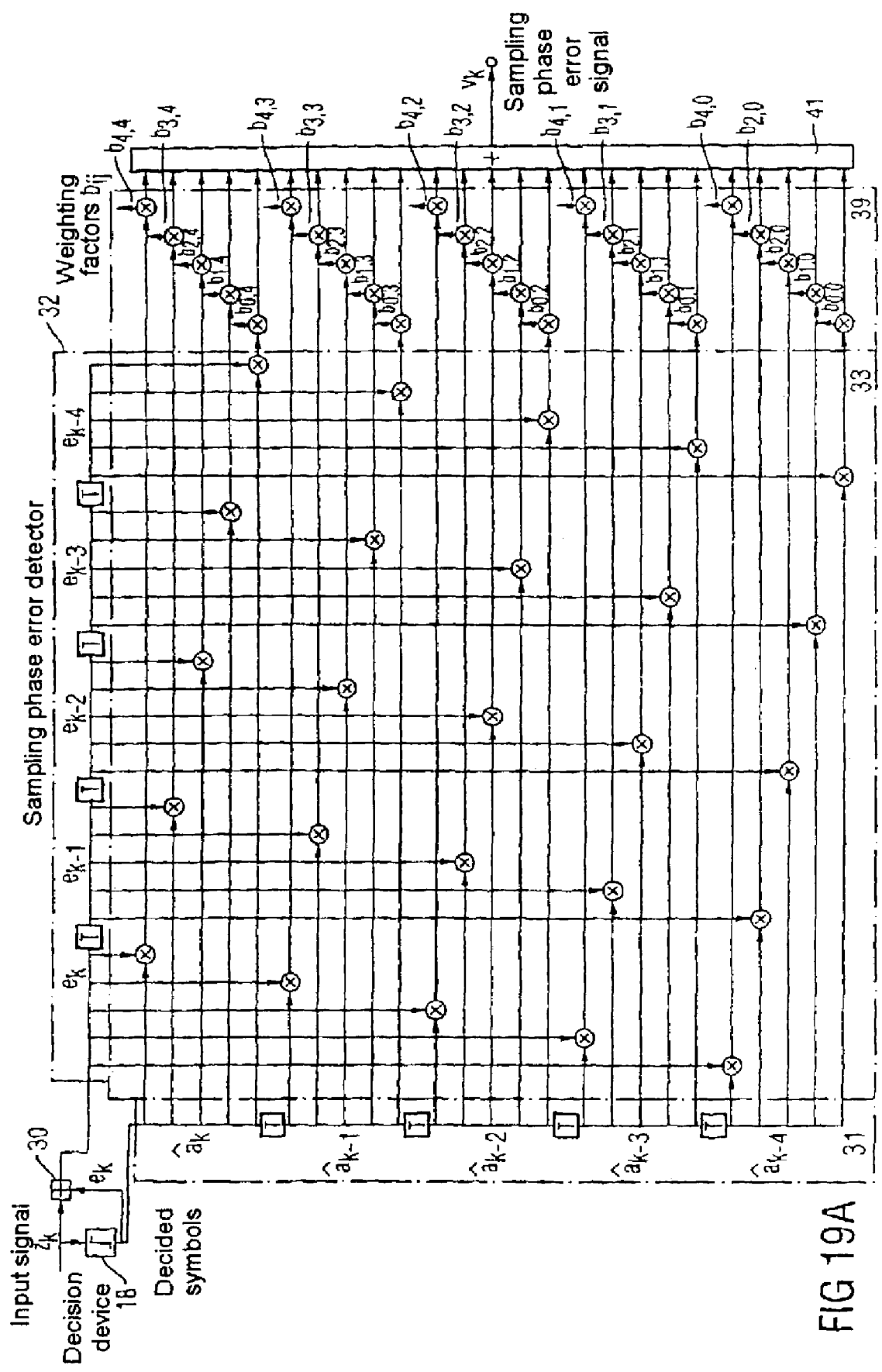
FIGS. 19a-19d show an example of the systematic determination of an embodiment of the inventive sampling phase error detector.

The procedure for optimizing a sampling phase detector is described by way of example below. As illustrated in FIG. 19a, a sampling phase detector with a 5×5 multiplier array is assumed for the selected example. L matrix elements on L different diagonals are set =0 in the weighting matrix B.

$$B = \begin{bmatrix} 0 & 0 & b_{0,2} & 0 & 0 \\ 0 & 0 & b_{1,2} & 0 & 0 \\ 0 & 0 & b_{2,2}=0 & 0 & 0 \\ 0 & 0 & b_{3,2} & 0 & 0 \\ 0 & 0 & b_{4,2} & 0 & 0 \end{bmatrix}$$

The matrix elements $b_{ij}$ are transmitted to the weighting circuit. The lines and multipliers whose weighting matrix elements are $b_{ij}=0$ are not executed. Consequently, only L product signals are formed.

Figure 19B:
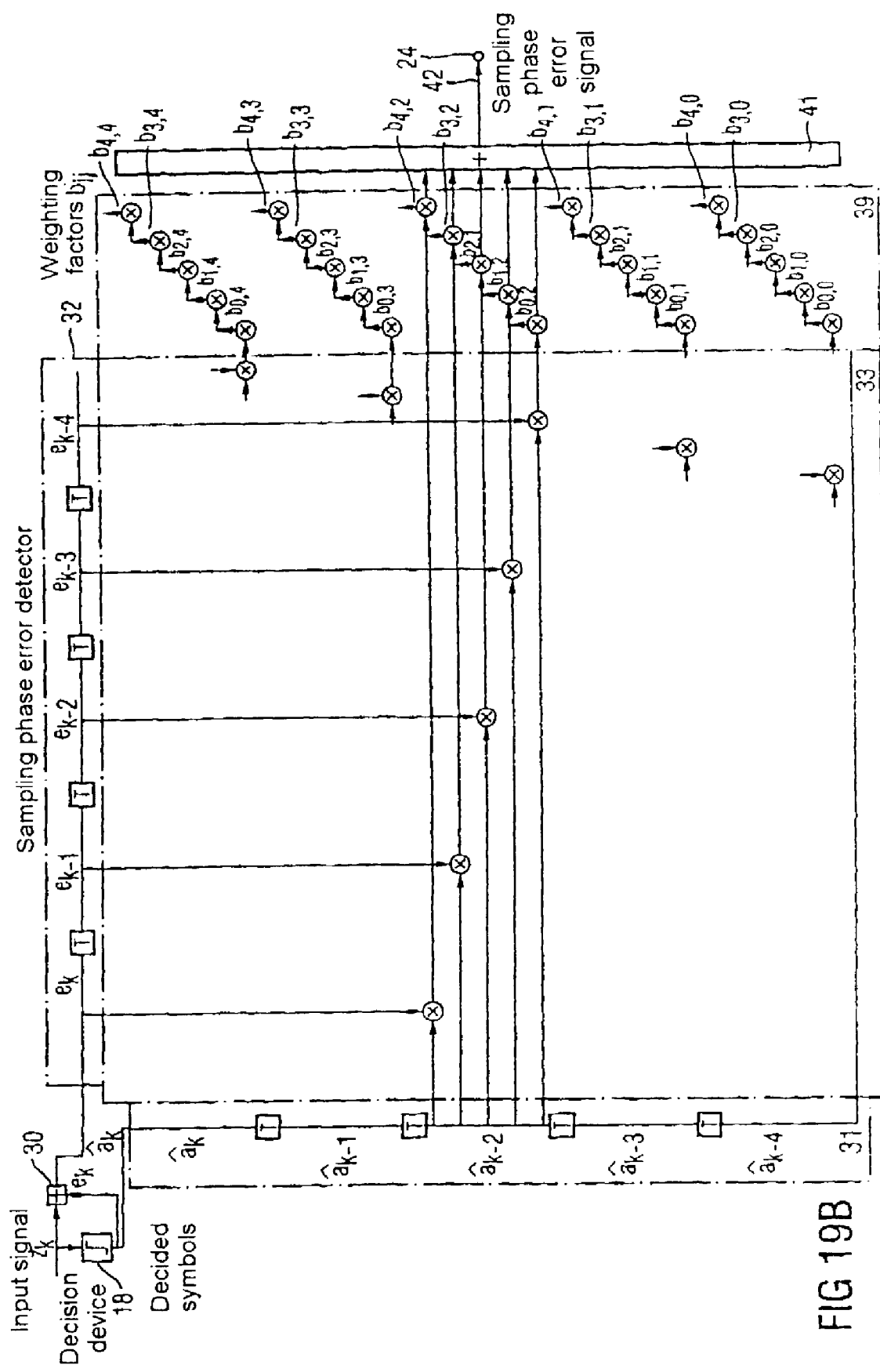

FIG. 19b shows the already simplified multiplier array of the matrix specified above.

Figure 19C:
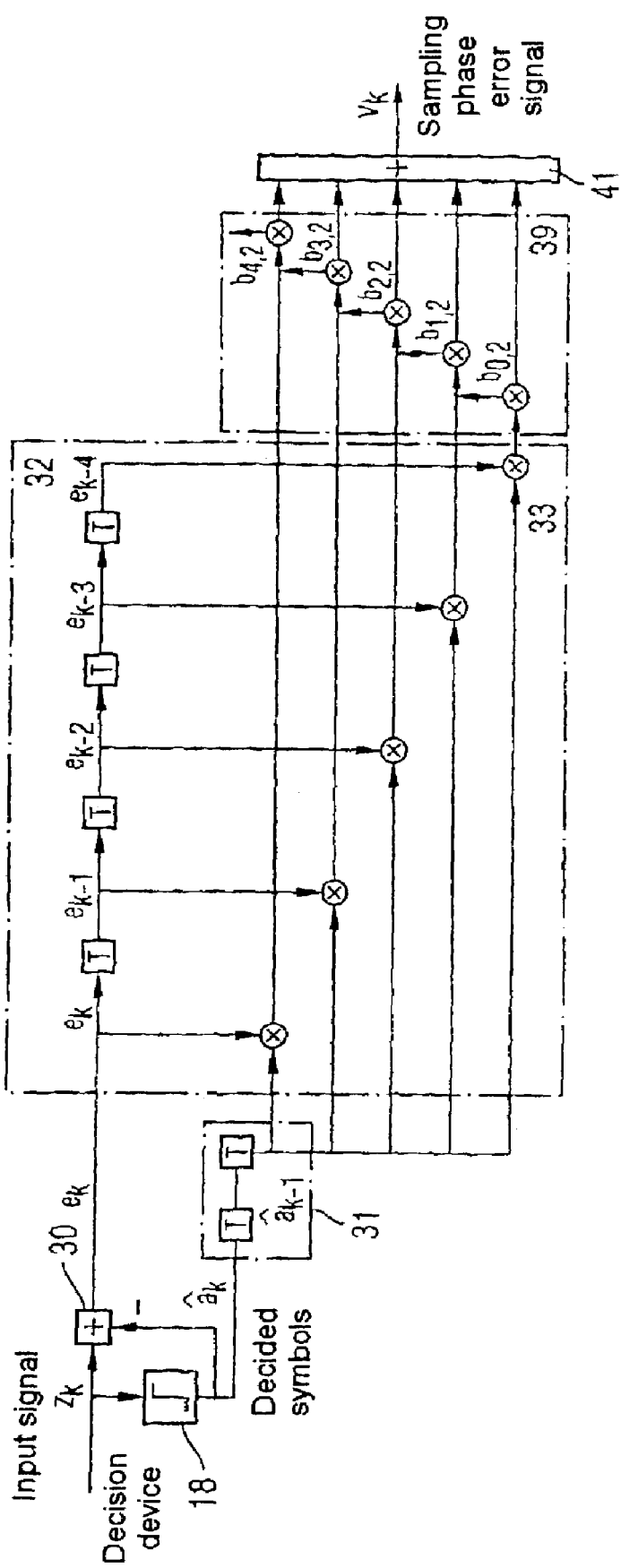

FIG. 19c shows the sampling phase detector illustrated in FIG. 19b in a simplified illustration.

Figure 19D:
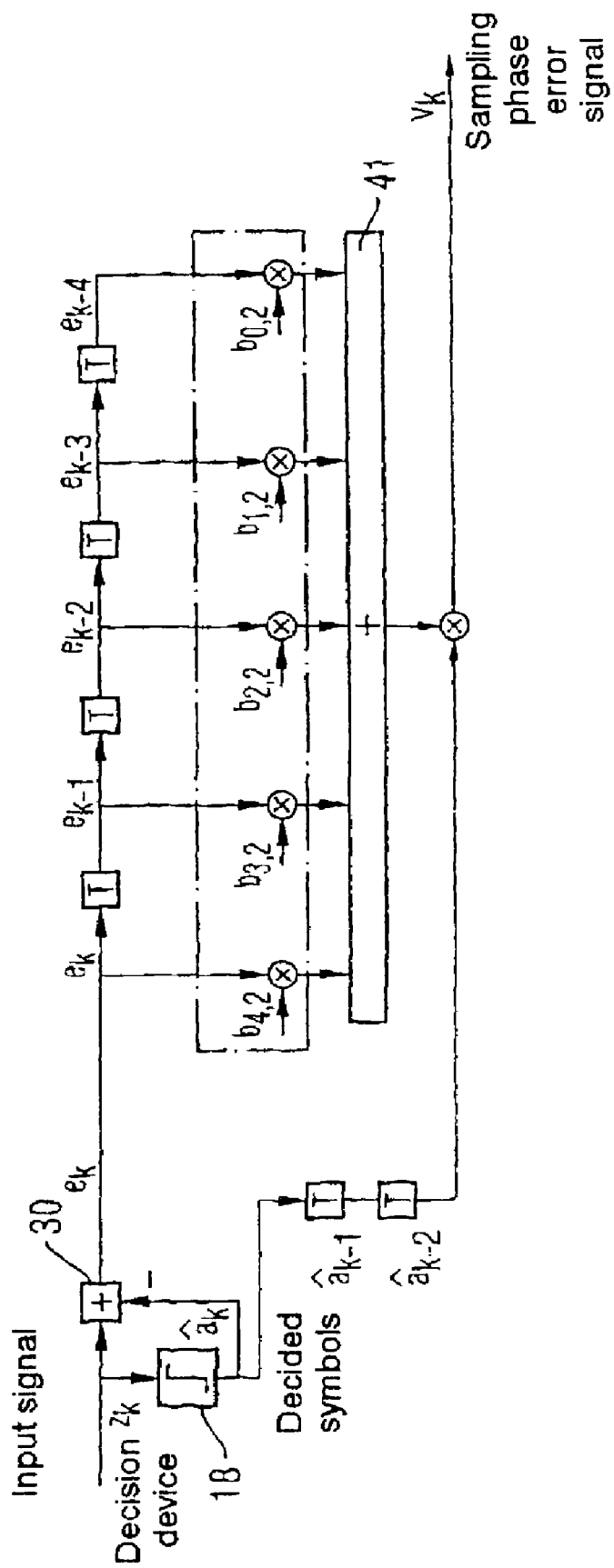

The sampling phase detector illustrated in FIG. 19c corresponds in terms of circuitry to the simplified sampling phase detector illustrated in FIG. 19d.

As may be seen from FIGS. 19a-19d, the general sampling phase error detector as illustrated in FIG. 19a can be simplified systematically to a sampling phase error detector with FIR filter.

Figure 20:
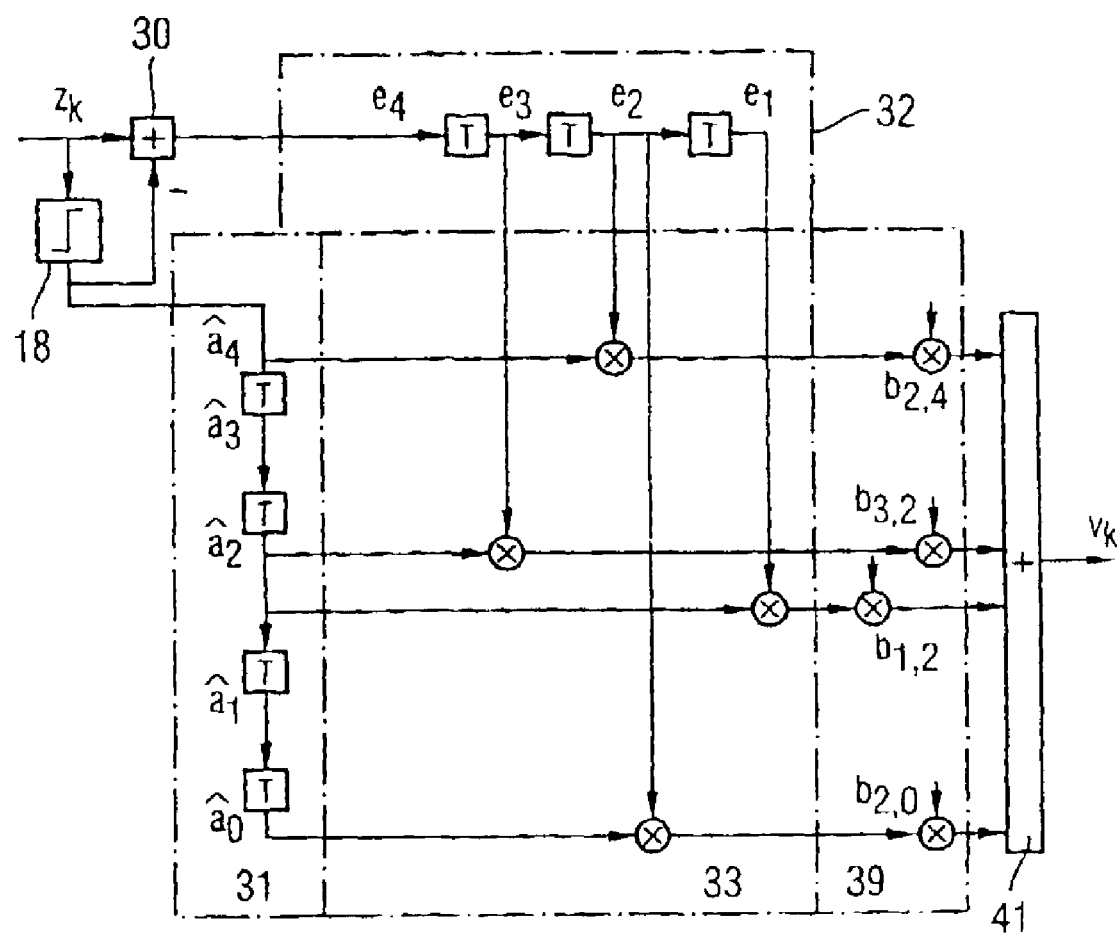
FIG. 20 shows a further example of an embodiment of the inventive sampling phase error detector.

FIG. 20 shows a further example for optimizing a sampling phase error detector starting from a general sampling phase error detector as illustrated in FIG. 19a. As in the case of the first example, the starting point is a sampling phase detector with a 5×5 multiplier array, as illustrated in FIG. 19a.

L matrix elements are subsequently set in the weighting matrix on L different primary diagonals.

The result is the following weighting matrix B:

$$B = \begin{bmatrix} 0 & 0 & 0 & 0 & 0 \\ 0 & 0 & b_{1,2} & 0 & 0 \\ b_{0,4} & 0 & b_{2,2}=0 & 0 & b_{2,4} \\ 0 & 0 & b_{3,2} & 0 & 0 \\ 0 & 0 & 0 & 0 & 0 \end{bmatrix}$$

The matrix elements $b_{ij}$ are transmitted to the weighting circuit. Those lines and multipliers whose matrix weights are $b_{ij}=0$ are not executed. The result is the embodiment illustrated in FIG. 20 of the inventive sampling phase error detector.

Further equivalent circuit arrangements inside the sampling phase error detector 1 can be systematically derived in a similar way. Theoretically, it is possible to derive 144 different circuit arrangements given L=5. FIGS. 18a-18c give examples of this.

Preferred values of the weighting factors $b_{ij}$ of the weighting matrix B are calculated according to the invention from the derivation of the samples of the pulse response $â_k(\tau)$ with reference to the sampling phase detector $\tau$. The following relationship exists in this case:

$$b_{i,j} = \frac{\partial}{\partial \tau} h_{i-j}$$

The coefficients calculated in this way are suitable, in particular, for circuit applications with relatively large additive noise.

The inventive calculation circuit for calculating a sampling phase error for a decision feedback phase regulation has the following properties.

A first delay element chain (31), which has $L_{31}-1$ serially connected delay elements, for delaying a digital estimate $â_K$ of a decision device. The signals in the delay element chain 31 are delayed by j clock pulses in each case. A delay chain with $L_{31}-1$ delay elements extends over $L_{31}$ clock pulses (j=0 also taken into account in the calculation).

A second delay element chain (32), which has $L_{32}-1$ serially connected delay elements, for delaying the equalized signal ($Z_k$, $e_k$). The signals in the delay element chain 32 are delayed by i clock pulses in each case. A delay chain with $L_{32}$ [lacuna] clock pulses (=[sic] i=0 also taken into account in the calculation).

The length $L_{31}$ of the delay element chain 32 are delayed by i clock pulses in each case [sic]. A delay chain with $L_{32}-1$ delay elements extends over $L_{32}$ clock pulses (i=0 also taken into account in the calculation). The length $L_{31}$ of the delay element chain 31 (the delay j=0 also being taken into account in the calculation) is not necessarily equal to the length $L_{32}$ of the delay element chain 32 (the delay i=0 is also taken into account in the calculation).

The signals from the delay element chain 31 are multiplied by the signals from the delay element chain 32 such that each difference x=i-j of the delay times is yielded precisely once in the case of these combinations.

The products are multiplied in the weighting circuit (39) by the weights $b_{ij}$. The weighted product signals are added.

[sic]

At most $L_{31}+L_{32}-1$ products can to [sic] be formed from input signals with differing differences between the delay cycles.

In a preferred form, the number of the products formed corresponds to the respectively greater value of either $L_{31}-1$ or $L_{32}-1$.

In a preferred form, the product of signals whose delay is i-j=0 is not formed.

In principle, products can be formed from any desired signals $e_{k-j}$ and $â_{k-j}$, if the difference x between the delays has the desired value. However, combinations of signals are preferred in the case of which the variance of the self noise in accordance with formula (7) is minimal.

What is claimed is:

1. A calculation circuit for calculating a sampling phase error signal for a decision feedback clock phase regulation circuit, having:
   (a) a first delay element chain, which has a plurality of serially connected delay elements, for delaying a digital estimate $â_k$ of a decision device;
   (b) a second delay element chain, which has a plurality of serially connected delay elements, for delaying an equalized signal;
   (c) a multiplier array which consists of multipliers arranged in matrix form and which multiplies the undelayed digital estimate $â_k$ and the delayed estimates of all the delay elements of the first delay element chain by the equalized signal and the delayed output signals of all the delay elements of the second delay element chain in order to generate product signals;
   (d) a weighting circuit which multiplies the product signals generated by the multiplier array by adjustable weighting factors; and having
   (e) an adder which adds the product signals weighted by the weighting circuit in order to generate the sampling phase error signal which is output via a signal output of the calculation circuit.

2. The calculation circuit according to claim 1, wherein a subtraction circuit is present which generates a differential signal between a digital received signal, equalized by an equalizer, and the estimate $â_k$ formed by the decision device.

3. The calculation circuit according to claim 2, wherein the differential signal is applied to the second delay element chain.

4. The calculation circuit according to claim 1, wherein the number of the serially connected delay elements in both delay element chains is identical.

5. The calculation circuit according to claim 4, wherein the delay elements are clocked at the symbol clock rate of a digital received signal.

6. The calculation circuit according to claim 1, wherein the signal output of the calculation circuit is connected to a loop filter for filtering the sampling phase error signal.

7. The calculation circuit according to claim 6, wherein a phase counter is connected downstream of the loop filter.

8. The calculation circuit according to claim 1, wherein the decision device receives a digital received signal transmitted via a transmission link.

9. The calculation according to claim 1, wherein the number of the serially connected delay elements of both delay element chains is a function of the duration of the pulse response h.

10. The calculation circuit according to claim 8, wherein the transmission link has:
   (a) a digital transmitting filter of a transmitter,
   (b) a digital-to-analog converter for converting the digital transmitted signal into an analog transmitted signal,
   (c) a transmission channel for transmitting the transmitted signal to a receiver,
   (d) an analog-to-digital converter for converting the received signal received via the transmission channel into a digital received signal,
   (e) a digital receive filter for filtering the digital received signal,
   (f) an equalizer for equalizing the digital received signal.

11. The calculation circuit according to claim 10, wherein an interpolator is provided between the digital receive filter and the equalizer.

12. The calculation circuit according to claim 11, wherein the analog-to-digital converter operates with a freerunning operating cycle, the interpolator being controlled by a sampling rate signal output by a phase counter.

13. The calculation circuit according to claim 4, wherein the multiplier array includes $L^2$ multipliers for generating $L^2$ product signals.

14. The calculation circuit according to claim 13, wherein the weighting circuit has $L^2$ multipliers for multiplying the product signals by the adjustable weighting factors.

15. The calculation circuit according to claim 1, wherein a programmable memory unit is provided for storing the weighting factors.

16. The calculation circuit according to claim 1, wherein the sampling phase error signal is calculated by a sampling phase detector in accordance with the following equation $$v(\tau) = \left\{ [e_0(\tau) \; e_1(\tau) \; \cdots \; \cdots \; e_{L-1}(\tau)] \cdot \begin{bmatrix} b_{0,0} & b_{0,1} & b_{0,2} & \cdots & b_{0,L-1} \\ b_{1,0} & b_{1,1} & b_{1,2} & & \\ b_{2,0} & b_{2,1} & b_{2,2} & & \\ & & & \ddots & \\ b_{L-1,0} & & & & b_{L-1,L-1} \end{bmatrix} \cdot \begin{bmatrix} \hat{a}_0 \\ \hat{a}_1 \\ \vdots \\ \vdots \\ \hat{a}_{L-1} \end{bmatrix} \right\} \quad (2)$$

where:
$e_i(t)$ are the equalized differential values,
B is the weighting coefficient matrix of the weighting circuit, and
$\hat{a}_i$ are the symbol estimates of the decision device.

17. A calculation circuit for calculating a sample phase error signal for a decision feedback clock phase regulation circuit, having:
   (a) a subtraction circuit which generates a differential signal between a digital received signal, equalized by an equalizer, and a digital estimate â(K) formed by a decision device;
   (b) a nonrecursive digital filter for filtering the differential signal, the nonrecursive digital filter having a delay element chain with a number of serially connected delay elements whose delayed output signals are multiplied in each case by an adjustable weighting coefficient and are added by an adder to a digital filter output signal, the weighting coefficient for the output signal of the delay element situated in the middle of the delay element chain being zero;
   (c) a delay circuit for delaying the digital estimate signal â(K) with a delay time between an input of the nonrecursive digital filter and the delay element, situated in the middle, inside the delay element chain, and having
   (d) a multiplier which multiplies the digital filter output signal of the nonrecursive digital filter by the output signal of the delay circuit to form the sampling phase error signal $V_k$.

18. The calculation circuit according to claim 17, wherein the weighting coefficients for the remaining delay elements of the delay element chain have values with point symmetry relative to the weighting coefficients for the delay element situated in the middle.

19. The calculation circuit according to claim 17, wherein connected downstream of the subtraction circuit is a sign circuit which detects the sign of the differential signal and supplies it to the nonrecursive digital filter.

20. The calculation circuit according to claim 17, wherein connected upstream of the delay circuit is a second sign circuit, which detects the sign of the digital estimate signal and supplies it to the delay circuit.

21. The calculation circuit according to claim 17, wherein the equalizer is an adaptive equalizer.

22. The calculation circuit according to claim 21, wherein filter coefficients of the adaptive equalizer are multiplied by stored decoupling coefficients and added to a phase reference signal value by means of an adder to form a decoupling signal.

23. A clock phase regulation circuit for clock phase regulation, having:
   (a) an analog-to-digital converter which samples an analog received signal with the aid of a sampling rate signal in order to generate a digital received signal;
   (b) an equalizer for equalizing the digital received signal;
   (c) a decision device which is connected downstream of the equalizer and generates a digital estimate signal $\hat{a}_K$ for the received signal from the equalized digital received signal;
   (d) a sampling phase error detector for generating a sample phase error signal $v_k$ for clock phase regulation, which specifies the phase deviation between the signal phase of the sampling rate signal and a setpoint signal phase of an ideal sampling rate signal; and having
   (e) a loop filter which filters the sampling rate error signal $v_k$ and supplies it as a sample signal to the analog-to-digital converter;
   (f) the sampling phase error detector having:
      (i) a subtraction circuit which generates a differential signal $e_k$ between the equalized digital received signal $z_k$ and the digital estimate signal $\hat{a}_K$,
      (ii) a first delay element chain which has a plurality of serially connected delay elements, for delaying the digital estimate $\hat{a}_K$ of the decision device, (iii) a second delay element chain, which has a plurality of serially connected delay elements, for delaying the equalized differential signal $e_k$, (iv) a multiplier array which consists of multipliers arranged in matrix form and which multiplies the undelayed digital estimate $\hat{a}_K$ and the delayed estimates of all the delay elements of the first delay element chain by the equalized differential signal $e_k$ and the delayed differential signals of all the delay elements of the second delay element chain in order to generate product signals, (v) a weighting circuit which multiplies the product signals generated by the multiplier array by adjustable weighting factors, and (vi) an adder which adds the product signals weighted by the weighting circuit in order to generate the sampling phase error signal $v_k$, which is supplied to the loop filter via a signal output of the sampling phase error detector.

24. A transceiver having a clock phase regulation circuit according to claim 23.

25. The transceiver according to claim 24, wherein an echo signal compensation circuit is provided for compensating an echo signal which is caused by a transmitted signal sent by the transceiver.

26. The transceiver according to claim 25, wherein an amplitude limiting circuit is provided which limits the amplitude of the filtered control signal to a limiting value, the limiting value being a function of an adjusting signal for the echo signal compensation circuit.

27. The transceiver according to claim 25, wherein a digital output signal of the echo compensation circuit is subtracted from filtered digital received signals by means of a subtractor in order to generate an echo-compensated digital received signal.

28. A data receiving device having a calculation circuit according to claim 1.

29. The data receiving device having a calculation circuit according to claim 28, wherein the data receiving device is a receiver for receiving an analog received signal.

30. The data receiving device having a calculation circuit according to claim 29, wherein the data receiving device is a reading device for reading out an analog signal.

31. The calculation circuit according to claim 2, wherein connected downstream of the subtraction circuit is a sign circuit which detects the sign of the differential signal and supplies it to the second delay element chain.

32. The calculation circuit according to claim 1, wherein connected upstream of the first delay element chain is a second sign circuit, which detects the sign of the digital estimate signal and supplies it to the first delay element chain.

* * * * *